United States Patent
Michalopoulos et al.

(10) Patent No.: US 12,439,363 B2
(45) Date of Patent: Oct. 7, 2025

(54) EFFICIENT PROVISION OF POSITIONING REFERENCE SIGNAL TRANSMISSIONS

(71) Applicant: NOKIA TECHNOLOGIES OY, Espoo (FI)

(72) Inventors: Diomidis Michalopoulos, Munich (DE); Timo Koskela, Oulu (FI); Juha Pekka Karjalainen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 411 days.

(21) Appl. No.: 17/927,136

(22) PCT Filed: Jun. 15, 2020

(86) PCT No.: PCT/EP2020/066482
§ 371 (c)(1),
(2) Date: Nov. 22, 2022

(87) PCT Pub. No.: WO2021/254591
PCT Pub. Date: Dec. 23, 2021

(65) Prior Publication Data
US 2023/0209495 A1    Jun. 29, 2023

(51) Int. Cl.
H04W 64/00        (2009.01)
(52) U.S. Cl.
CPC ................. H04W 64/00 (2013.01)
(58) Field of Classification Search
CPC ............. H04W 64/00; H04W 52/0254; H04W 52/028; G01S 5/0236
See application file for complete search history.

(56) References Cited

U.S. PATENT DOCUMENTS

| | | | |
|---|---|---|---|
| 2018/0132203 A1* | 5/2018 | Saxon | G01S 5/0236 |
| 2019/0239181 A1 | 8/2019 | Gangakhedkar et al. | |
| 2019/0353746 A1 | 11/2019 | Razavi et al. | |
| 2019/0383746 A1* | 12/2019 | Vacca | G01N 21/65 |
| 2020/0028648 A1 | 1/2020 | Akkarakaran et al. | |
| 2020/0154240 A1* | 5/2020 | Edge | H04W 4/029 |

OTHER PUBLICATIONS

International Search Report and Written Opinion dated Feb. 22, 2021 corresponding to International Patent Application No. PCT/EP2020/066482.

(Continued)

*Primary Examiner* — Brandon J Miller
(74) *Attorney, Agent, or Firm* — Lippes Mathias LLP

(57) ABSTRACT

There are provided measures for efficient provision of positioning reference signal transmissions. Such measures exemplarily comprise, at of a location service control entity in a mobile network providing positioning reference signals for location determination, deciding to suspend positioning reference signal transmission using a first positioning reference signal resource, and configuring, upon a result of said deciding to suspend said positioning reference signal transmission, an access node supplying at least one location determination target with said positioning reference signal transmission using said first positioning reference signal resource, to suspend said positioning reference signal transmission.

18 Claims, 18 Drawing Sheets

S71
deciding to suspend positioning reference signal transmission using a first positioning reference signal resource S72
configuring, upon a result of said deciding to suspend said positioning reference signal transmission, an access node supplying at least one location determination target with said positioning reference signal transmission using said first positioning reference signal resource, to suspend said positioning reference signal transmission

(56) References Cited

OTHER PUBLICATIONS

Qualcomm Incorporated, "On Demand Transmission of PRS for NR," R2-1901373, 3GPP TSG-RAN WG2 Meeting #105, Athens, Greece, Feb. 25-Mar. 1, 2019.
Ericsson, "Co-ordination among UE, gNB and Location Server for PRS Configuration and Feedbacks," R2-1901533, 3GPP TSG RAN WG2#105, Athens, Greece, Feb. 25-Mar. 1, 2019.
Nokia et al., "On-demand and dynamic PRS configuration for DL-TDOA," R2-1916106, 3GPP TSG-RAN WG2 Meeting #108, Reno, USA, Nov. 18-22, 2019.
Nokia et al., "Measurements for PRS on-demand," R1-1905265, 3GPP TSG RAN WG1 #96bis, Xi'an, China, Apr. 8-12, 2019.
3GPP TS 38.214 V16.1.0 (Mar. 2020), Technical Specification, 3rd Generation Partnership Project; Technical Specification Group Radio Access Network; NR; Physical layer procedures for data (Release 16), Mar. 2020.

* cited by examiner

EFFICIENT PROVISION OF POSITIONING REFERENCE SIGNAL TRANSMISSIONS

FIELD

The present invention relates to efficient provision of positioning reference signal transmissions. More specifically, the present invention exemplarily relates to measures (including methods, apparatuses and computer program products) for realizing efficient provision of positioning reference signal transmissions.

BACKGROUND

The present specification generally relates to enhancement of positioning methods with regards to network efficiency.

With respect to 3$^{rd}$ Generation Partnership Project (3GPP) New Radio (NR) technology, it is envisaged to support high accuracy (horizontal and vertical), low latency, network efficiency (scalability, RS overhead, etc.), and device efficiency (power consumption, complexity, etc.) requirements for commercial uses cases incl. general commercial use cases and specifically (industrial) internet-of-things ((I)IoT) use cases. Heretofore, it is a general task that additional scenarios (e.g. (I)IoT) are to be defined based on TR 38.901 to evaluate the performance for the use cases (e.g. (I)IoT), that the achievable positioning accuracy and latency are to be evaluated with the Rel-16 positioning solutions in (I)IoT scenarios and identify any performance gaps, and that positioning techniques, DL/UL positioning reference signals, signaling and procedures for improved accuracy, reduced latency, network efficiency, and device efficiency are to be identified and evaluated.

As a general framework, it is envisaged that enhancements to Rel-16 positioning techniques, if they meet the requirements, will be prioritized, and new techniques will not be considered in this case.

Network efficiency relates to the concepts of dynamic PRS and on-demand PRS (see, e.g., 3GPP R2-1901373, "On Demand Transmission of PRS for NR", Qualcomm Incorporated, RAN2 #105, February 2019, R2-1901533, "Co-ordination among UE, gNB and Location Server for PRS Configuration and Feedbacks", Ericsson, RAN2 #105, February 2019). In short, dynamic and on-demand PRS refers to the case where the positioning reference signals (PRS) are not transmitted in a fixed and constant fashion (as is the case in 3GPP Long Term Evolution (LTE)), but in a rather dynamic fashion.

In particular, the concept of on-demand PRS states that PRS are transmitted only to the direction where there is at least one user equipment (UE) which will receive and process the PRS for deriving the location of the UE (either at the UE itself or at the network side after the measurements are reported to the network). Similarly, dynamic PRS dictates that in case there is a need for stronger reception of PRS signals (for instance, for higher accuracy), then the network can provide increased PRS resources to the designated areas.

The concept of dynamic/on-demand PRS is particularly relevant for NR, due to the associated beamforming.

FIG. 10 shows a schematic diagram of an example of a system environment for positioning reference signal transmissions in an LTE scenario.

Here, without beam based techniques, PRS transmissions are effected on a cell base (i.e., PRS A by/for cell A, PRS B by/for cell B, and PRS C by/for cell C).

FIG. 11 shows a schematic diagram of an example of a system environment for positioning reference signal transmissions in an NR scenario.

In particular, FIG. 11 illustrates PRS transmissions in beams in an NR scenario. Here, e.g. PRS 11A1, 11A2, 11A3, 11A4, 11A5, 11A6, 11A7, 11A8 (corresponding to PRS A #1 to PRS A #8, i.e., to PRS #1 to #8 of cell A) are transmitted in beams in cell A. Further, e.g. PRS 11B1, 11B2, 11B3, 11B4, 11B5, 11B6, 11B7, 11B8 (corresponding to PRS B #1 to PRS B #8, i.e., to PRS #1 to #8 of cell B) are transmitted in beams in cell B. Further, e.g. PRS 11C1, 11C2, 11C3, 11C4, 1105, 1106, 11C7, 11C8 (corresponding to PRS C #1 to PRS C #8, i.e., to PRS #1 to #8 of cell C) are transmitted in beams in cell C. Given that PRS resources are transmitted from different beams in order to achieve good coverage, transmitting PRS from all beams of a cell would result in a waste of resources. Accordingly, on-demand (dynamic) PRS would be a resource-efficient approach.

In LTE, the main use case for network-based positioning (referred to as radio access technology (RAT)-dependent positioning), was the so-called 911-service; that is, identifying the location/origin of emergency calls. This means that the location service in LTE has a "one-shot" triggering signal, and the service is terminated once the location of the UE is obtained at the requesting network entity. There is, in fact, no continuation of the location service considered, but the service is rather in the format of "request→receive".

NR, on the contrary, includes several additional services which require location information in a more continuous fashion. Typical examples of such services relate to industrial applications, where a set of mobile UEs perform operations where location information is required (e.g., automated guided vehicles (AGVs) within factories or vehicle-to-X (V2X) applications where satellite coverage is not sufficient and hence partially continuous location information provided by the network is needed). This implies that NR location services are not "one-shot" services (as in LTE), but rather have a start and stop time instance such that location service should be provided within that time interval.

This main feature of NR location services, in conjunction with the PRS transmission over beams in NR, constitutes the main problem scenario treated in this invention.

Namely, some UEs in the network that may have special needs or requirements for positioning e.g. accuracy/latency requirements, may require special configuration of PRS resources that could be additional/alternative to the periodic PRS transmission that are available for all UEs. Considering this type of PRS configuration the problem of efficient management of resources rise especially in a beam based system where the transmission of PRS reserve not only time-frequency resource but also spatial resources. In particular, the problem arises that measurements for the network to activate/deactivate the PRS transmission in a dynamic way are necessary, assuming that the location service is not always active and thus the network needs to maintain resource efficiency as much as possible. Further, the problem arises that measurements for enabling efficient management and transmission of PRS resources at network, for example in a semi-continuous fashion, are necessary.

FIGS. 12 and 13 show a schematic diagram of an example of a system environment for positioning reference signal transmissions in NR scenarios according to exemplary embodiments of the present invention.

In particular, FIGS. 12 and 13 illustrate managing PRS resources for UEs with active and inactive (suspended) location services.

In more detail, FIGS. 12 and 13 show an exemplary implementation, where PRS are transmitted from a set of beams covering certain coverage areas.

In FIG. 12, both depicted UEs (UE1, UE2) have an active positioning session (location service), hence PRS resources are transmitted from the targeted beams from the three participating cells (that is, the vertically hachured PRS resources for UE1, from cells 1, 2, 3, respectively; the horizontally hachured PRS resources for UE2, from cells 1, 2, 3, respectively).

On the other hand, in FIG. 13, only one of the depicted UEs (UE1) has an active positioning session (location service), while the other of the depicted UEs (UE2) has an inactive positioning session (location service). Hence, it would be advantageous if only PRS resources related to the active positioning session of UE1 would be transmitted from the targeted beams from the three participating cells (that is, the vertically hachured PRS resources for UE1, from cells 1, 2, 3, respectively).

3GPP R2-1901373, "On Demand Transmission of PRS for NR", Qualcomm Incorporated, RAN2 #105, February 2019, 3GPP R2-1901533, "Co-ordination among UE, gNB and Location Server for PRS Configuration and Feedbacks", Ericsson, RAN2 #105, February 2019, 3GPP R2-1916106, "Dynamic vs on-demand PRS", Nokia, RAN2 #108, November 2019, and 3GPP R1-1905265, "Measurements for PRS on-demand", Nokia, RAN1 #96bis, April 2019, each discuss the mode of operation of dynamic and on-demand PRS approaches.

However, none of these documents address, among others, the above outlined exemplary scenario of inactive positioning sessions (location services) leading to waste of PRS resources both in time-frequency domain and in spatial domain.

Hence, the problem arises that the present or envisaged application of PRS techniques in particular in beamforming scenarios leads to waste of PRS resources both in time-frequency domain and in spatial domain and thereby contradict network efficiency requirements.

Hence, there is a need to provide for efficient provision of positioning reference signal transmissions.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of a location service control entity in a mobile network providing positioning reference signals for location determination, the method comprising deciding to suspend positioning reference signal transmission using a first positioning reference signal resource, and configuring, upon a result of said deciding to suspend said positioning reference signal transmission, an access node supplying at least one location determination target with said positioning reference signal transmission using said first positioning reference signal resource, to suspend said positioning reference signal transmission.

According to an exemplary aspect of the present invention, there is provided a method of an access node of a mobile network providing positioning reference signals for location determination, the access node supplying at least one location determination target with positioning reference signal transmission using a first positioning reference signal resource, the method comprising receiving information on suspension of said positioning reference signal transmission using said first position reference signal resource, and implementing suspension of said positioning reference signal transmission.

According to an exemplary aspect of the present invention, there is provided a method of a terminal in a mobile network providing positioning reference signals for location determination, the method comprising identifying a state in which said terminal does not utilize positioning reference signal transmission using a first positioning reference signal resource supplied for at least said terminal by an access node, and transmitting information on suspension of said positioning reference signal transmission using said first positioning reference signal resource.

According to an exemplary aspect of the present invention, there is provided an apparatus of a location service control entity in a mobile network providing positioning reference signals for location determination, the apparatus comprising deciding circuitry configured to decide to suspend positioning reference signal transmission using a first positioning reference signal resource, and configuring circuitry configured to configure, upon a result of said deciding circuitry to suspend said positioning reference signal transmission, an access node supplying at least one location determination target with said positioning reference signal transmission using said first positioning reference signal resource, to suspend said positioning reference signal transmission.

According to an exemplary aspect of the present invention, there is provided an apparatus of an access node of a mobile network providing positioning reference signals for location determination, the access node supplying at least one location determination target with positioning reference signal transmission using a first positioning reference signal resource, the apparatus comprising receiving circuitry configured to receive information on suspension of said positioning reference signal transmission using said first position reference signal resource, and implementing circuitry configured to implement suspension of said positioning reference signal transmission.

According to an exemplary aspect of the present invention, there is provided an apparatus of a terminal in a mobile network providing positioning reference signals for location determination, the apparatus comprising identifying circuitry configured to identify a state in which said terminal does not utilize positioning reference signal transmission using a first positioning reference signal resource supplied for at least said terminal by an access node, and transmitting circuitry configured to transmit information on suspension of said positioning reference signal transmission using said first positioning reference signal resource.

According to an exemplary aspect of the present invention, there is provided an apparatus of a location service control entity in a mobile network providing positioning reference signals for location determination, the apparatus comprising at least one processor, at least one memory including computer program code, and at least one interface configured for communication with at least another apparatus, the at least one processor, with the at least one memory and the computer program code, being configured to cause the apparatus to perform deciding to suspend positioning reference signal transmission using a first positioning reference signal resource, and configuring, upon a result of said deciding to suspend said positioning reference signal transmission, an access node supplying at least one location determination target with said positioning reference signal transmission using said first positioning reference signal resource, to suspend said positioning reference signal transmission.

According to an exemplary aspect of the present invention, there is provided an apparatus of an access node of a mobile network providing positioning reference signals for location determination, the access node supplying at least one location determination target with positioning reference signal transmission using a first positioning reference signal resource, the apparatus comprising at least one processor, at least one memory including computer program code, and at least one interface configured for communication with at least another apparatus, the at least one processor, with the at least one memory and the computer program code, being configured to cause the apparatus to perform receiving information on suspension of said positioning reference signal transmission using said first position reference signal resource, and implementing suspension of said positioning reference signal transmission.

According to an exemplary aspect of the present invention, there is provided an apparatus of a terminal in a mobile network providing positioning reference signals for location determination, the apparatus comprising at least one processor, at least one memory including computer program code, and at least one interface configured for communication with at least another apparatus, the at least one processor, with the at least one memory and the computer program code, being configured to cause the apparatus to perform identifying a state in which said terminal does not utilize positioning reference signal transmission using a first positioning reference signal resource supplied for at least said terminal by an access node, and transmitting information on suspension of said positioning reference signal transmission using said first positioning reference signal resource.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient management and utilization of positioning reference signal transmissions, and thus, an efficient utilization of corresponding network resources both in time-frequency domain and in spatial domain to thereby solve at least part of the problems and drawbacks identified in relation to the prior art.

In particular, exemplary embodiments of the present invention enable more scheduling flexibility for the network, as the network can opportunistically, e.g. based on a UE's indication, suspend the transmission of PRS for specific beams, i.e., the network may use the spatial resources to schedule other UEs or schedule data for the given UE. In addition, exemplary embodiments of the present invention achieve network power saving, since the network is able for discontinuous transmission (DTX) of specific PRS resources.

By way of exemplary embodiments of the present invention, there is provided efficient provision of positioning reference signal transmissions. More specifically, by way of exemplary embodiments of the present invention, there are provided measures and mechanisms for realizing efficient provision of positioning reference signal transmissions.

Thus, improvement is achieved by methods, apparatuses and computer program products enabling/realizing efficient provision of positioning reference signal transmissions.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) efficient provision of positioning reference signal transmissions.

As already discussed above, FIGS. 12 and 13 show an exemplary implementation, where PRS are transmitted from a set of beams covering certain coverage areas.

Figure 12:
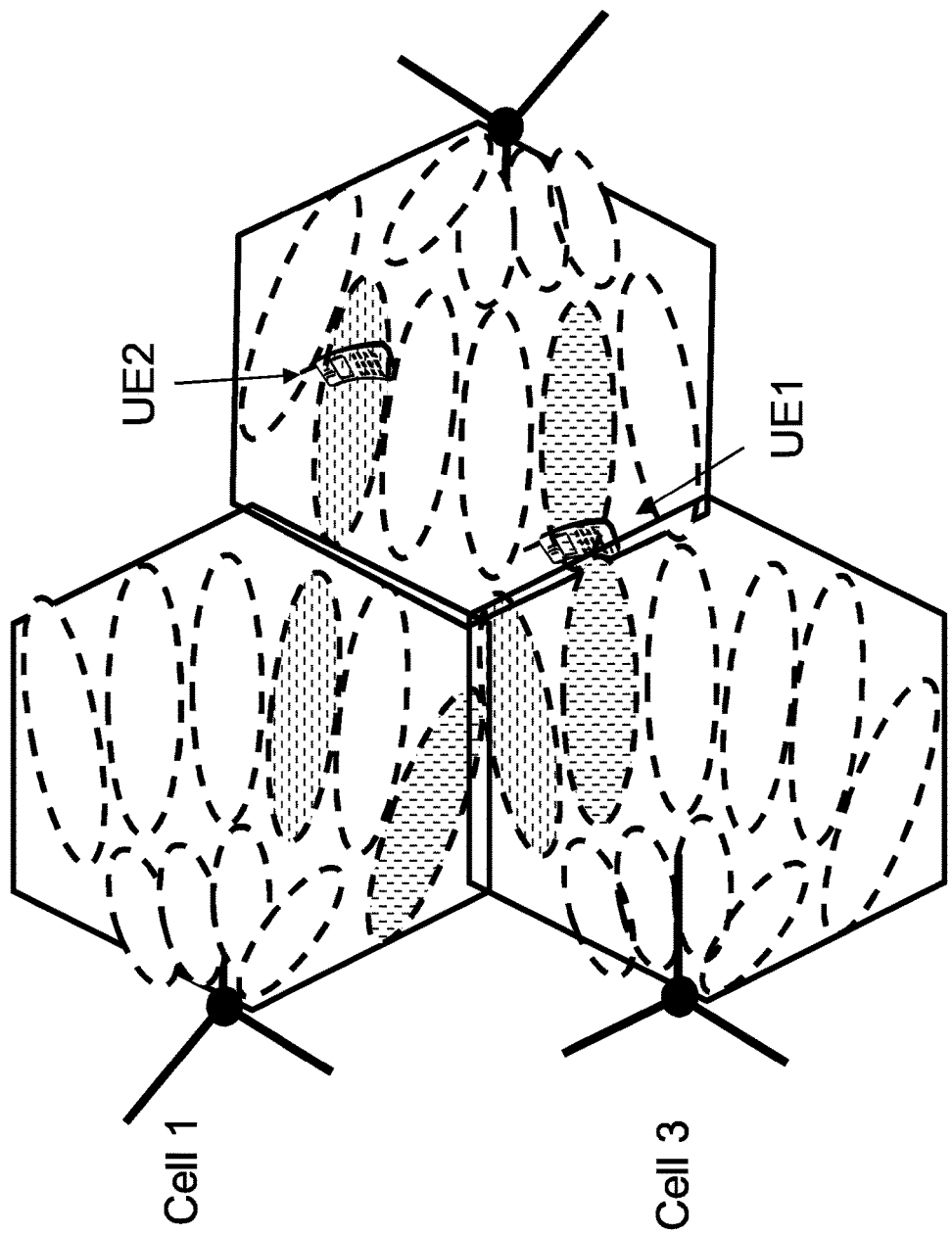
FIG. 12 shows a schematic diagram of an example of a system environment for positioning reference signal transmissions in NR scenarios according to exemplary embodiments of the present invention.

In FIG. 12, both depicted UEs (UE1, UE2) have an active positioning session (location service), hence PRS resources are transmitted from the targeted beams from the three participating cells (that is, the vertically hachured PRS resources for UE1, from cells 1, 2, 3, respectively; the horizontally hachured PRS resources for UE2, from cells 1, 2, 3, respectively).

Figure 13:
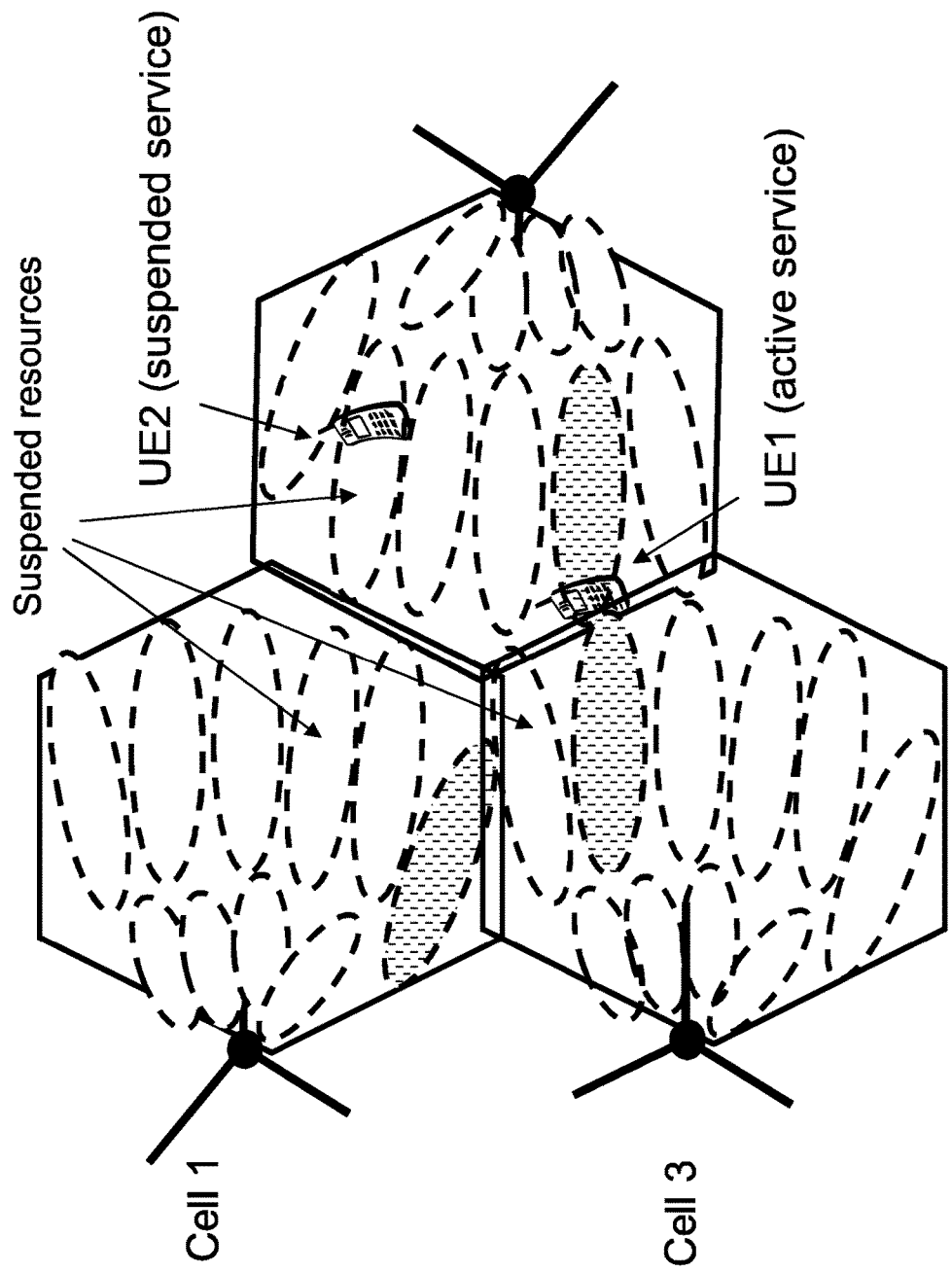
FIG. 13 shows a schematic diagram of an example of a system environment for positioning reference signal transmissions in NR scenarios according to exemplary embodiments of the present invention.

On the other hand, in FIG. 13 illustrating a potential scenario applying the concept of exemplary embodiments of the present invention, only one of the depicted UEs (UE1) has an active positioning session (location service), while the other of the depicted UEs (UE2) has an inactive positioning session (location service). In view thereof, according to exemplary embodiments of the present invention, only PRS resources related to the active positioning session of UE1 are transmitted from the targeted beams from the three participating cells (that is, the vertically hachured PRS resources for UE1, from cells 1, 2, 3, respectively), while the PRS resources related to the formerly active positioning session of UE2 (i.e., the horizontally hachured PRS resources in FIG. 12) are not transmitted from the targeted beams from the three participating cells but suspended.

As such, exemplary embodiments of the present invention close the gap left open by present or envisaged techniques shown in FIG. 12 under the assumption that UE2 would have an inactive positioning session while PRS resources related to the positioning session of UE2 are nevertheless transmitted from the targeted beams from the three participating cells (that is, the horizontally hachured PRS resources for UE2, from cells 1, 2, 3, respectively).

In order to achieve such behavior, according to exemplary embodiments of the present invention, a managing method is provided with both network and UE aspects, which specifies the conditions and exchanged signaling for suspending the transmission of PRS resources and for resuming (when needed) the transmission of PRS resources both in a dynamic fashion. In particular, according to exemplary embodiments of the present invention, a method is provided that allows the network to suspend the transmission of a PRS for semi-continuous location sessions, until the location of the same UE is requested again where the session and the respective PRS transmission is resumed.

Such behavior is not foreseen according to present or envisaged techniques, as there is no consideration of any suspend mechanism where the on-demand PRS is halted since there is no further request for PRS from a given resource (or beam).

Figure 1:
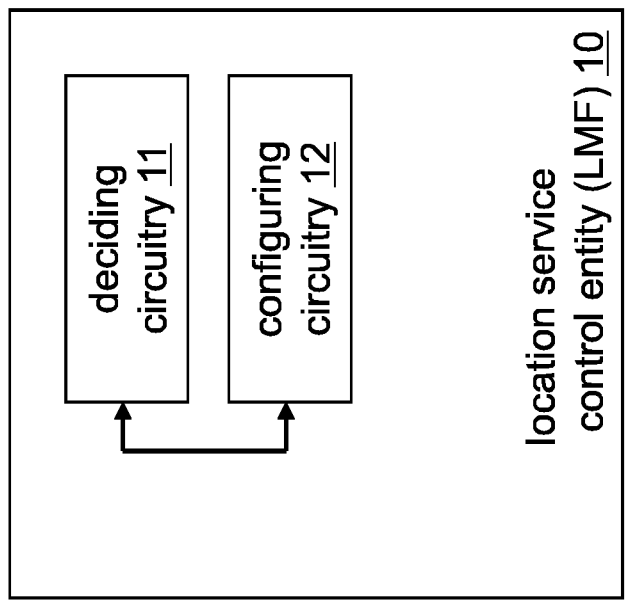
FIG. 1 is a block diagram illustrating an apparatus according to exemplary embodiments of the present invention.
Figure 7:
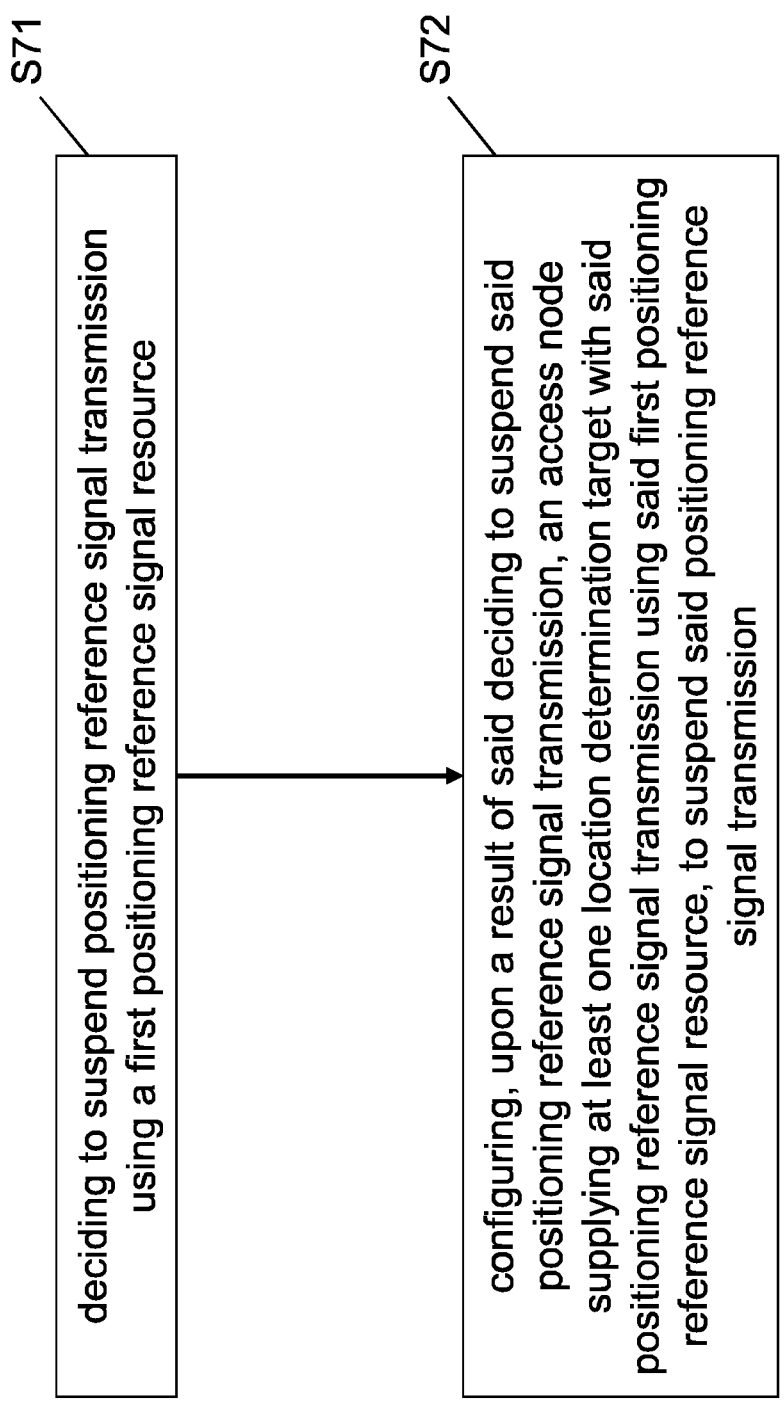
FIG. 7 is a schematic diagram of a procedure according to exemplary embodiments of the present invention.

FIG. 1 is a block diagram illustrating an apparatus according to exemplary embodiments of the present invention. The apparatus may be a network node 10 such as a location service control entity such as a location management function entity (in a mobile network providing positioning reference signals for location determination) comprising a deciding circuitry 11 and a configuring circuitry 12. The deciding circuitry 11 decides to suspend positioning reference signal transmission using a first positioning reference signal resource. The configuring circuitry 12 configures, upon a result of said deciding circuitry 11 to suspend said positioning reference signal transmission, an access node supplying at least one location determination target with said positioning reference signal transmission using said first positioning reference signal resource, to suspend said positioning reference signal transmission. FIG. 7 is a schematic diagram of a procedure according to exemplary embodiments of the present invention. The apparatus according to FIG. 1 may perform the method of FIG. 7 but is not limited to this method. The method of FIG. 7 may be performed by the apparatus of FIG. 1 but is not limited to being performed by this apparatus.

As shown in FIG. 7, a procedure according to exemplary embodiments of the present invention comprises an operation of deciding (S71) to suspend positioning reference signal transmission using a first positioning reference signal resource, and an operation of configuring (S72), upon a result of said deciding (S71) to suspend said positioning reference signal transmission, an access node supplying at least one location determination target with said positioning reference signal transmission using said first positioning reference signal resource, to suspend said positioning reference signal transmission.

Figure 2:
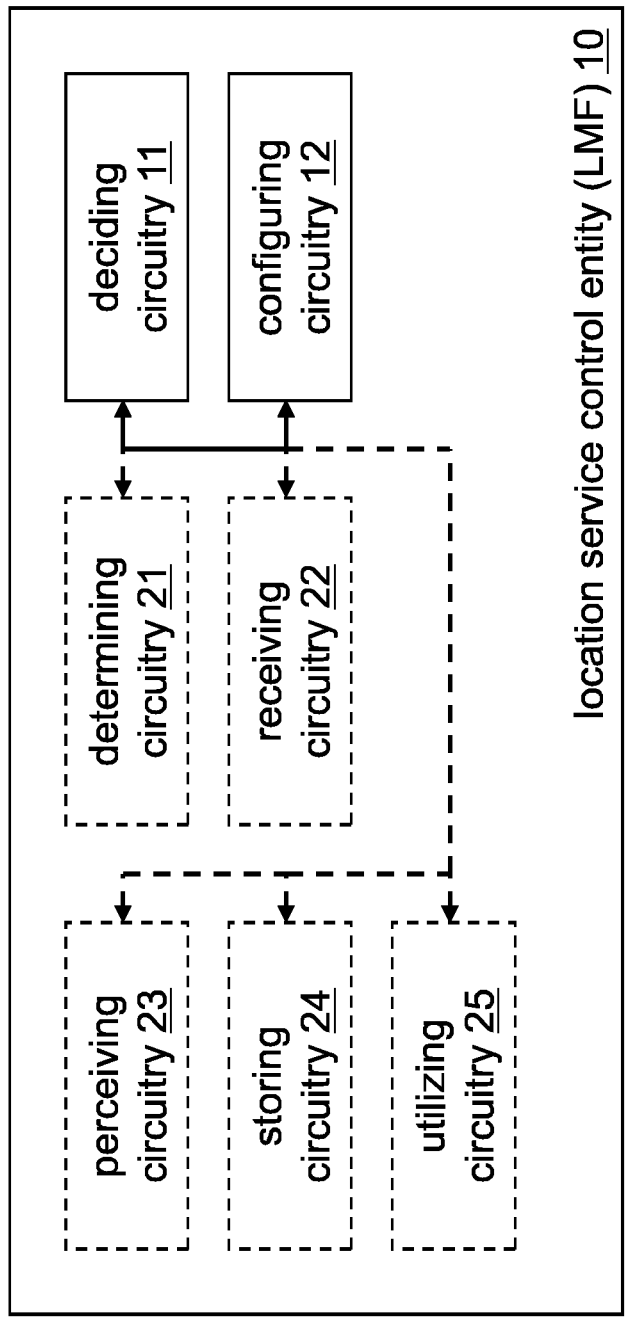
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a determining circuitry 21, a receiving circuitry 22, a perceiving circuitry 23, a storing circuitry 24, and/or a utilizing circuitry 25.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 7, exemplary additional operations are given, which are inherently independent from each other as such. According to such variation, an exemplary method according to exemplary embodiments of the present invention may comprise an operation of determining whether a suspension condition to suspend said positioning reference signal transmission is fulfilled. According to such variation, said deciding to suspend is based on whether said suspension condition is fulfilled.

According to a variation of the procedure shown in FIG. 7, said positioning reference signal transmission using said first positioning reference signal resource is related to a continuous location service request of a positioning client node requesting said location determination of said location determination target. According to such variation, exemplary details of the determining operation (determining whether said suspension condition is fulfilled) are given, which are inherently independent from each other as such. Such exemplary determining operation according to exemplary embodiments of the present invention may comprise an operation of receiving, from said location determination target, an indication to suspend said positioning reference signal transmission. Alternatively, such exemplary determining operation according to exemplary embodiments of the present invention may comprise an operation of receiving, from said location determination target, an indication that said location determination target does not utilize said positioning reference signal transmission. Alternatively, such exemplary determining operation according to exemplary embodiments of the present invention may comprise an operation of receiving, from said positioning client node requesting said location determination of said location determination target, a suspend message indicating to suspend said positioning reference signal transmission. Alternatively, such exemplary determining operation according to exemplary embodiments of the present invention may comprise an operation of receiving, from said access node, an indication that said access node is ready to suspend said positioning reference signal transmission. Alternatively, such exemplary determining operation according to exemplary embodiments of the present invention may comprise an operation of perceiving that a validity timer associated with said continuous location service request is expired.

According to a variation of the procedure shown in FIG. 7, said positioning reference signal transmission using said first positioning reference signal resource is related to a one-shot location service request of a positioning client node requesting said location determination of said location determination target. According to such variation, exemplary details of the determining operation (determining whether said suspension condition is fulfilled) are given, which are inherently independent from each other as such. Such exemplary determining operation according to exemplary embodiments of the present invention may comprise an operation of receiving location information for said location determination target. Alternatively, such exemplary determining operation according to exemplary embodiments of the present invention may comprise an operation of receiving an indication that said location information for said location determination target were received.

According to a variation of the procedure shown in FIG. 7, exemplary additional operations are given, which are inherently independent from each other as such. According to such variation, an exemplary method according to exemplary embodiments of the present invention may comprise an operation of deciding to resume said positioning reference signal transmission, and an operation of configuring, upon a result of said deciding to resume said positioning reference signal transmission, said access node supplying said at least one location determination target with said positioning reference signal transmission, to resume said positioning reference signal transmission using said first positioning reference signal resource.

According to a variation of the procedure shown in FIG. 7, exemplary additional operations are given, which are inherently independent from each other as such. According to such variation, an exemplary method according to exemplary embodiments of the present invention may comprise an operation of deciding to resume said positioning reference signal transmission, and an operation of configuring, upon a result of said deciding to resume said positioning reference signal transmission, said access node supplying said at least one location determination target with said positioning reference signal transmission, to resume said positioning reference signal transmission using a second positioning reference signal resource different from said first positioning reference signal resource.

According to a variation of the procedure shown in FIG. 7, exemplary additional operations are given, which are inherently independent from each other as such. According to such variation, an exemplary method according to exemplary embodiments of the present invention may comprise an operation of determining whether a resumption condition to resume said positioning reference signal transmission is fulfilled. According to such variation, said deciding to resume is based on whether said resumption condition is fulfilled.

According to a variation of the procedure shown in FIG. 7, said positioning reference signal transmission using said first positioning reference signal resource is related to a continuous location service request of a positioning client node requesting said location determination of said location determination target. According to such variation, exemplary details of the determining operation (determining whether said resumption condition is fulfilled) are given, which are inherently independent from each other as such. Such exemplary determining operation according to exemplary embodiments of the present invention may comprise an operation of receiving, from said location determination target, an indication to resume said positioning reference signal transmission. Alternatively, such exemplary determining operation according to exemplary embodiments of the present invention may comprise an operation of receiving, from said positioning client node requesting said location determination of said location determination target, a resume message indicating to resume said positioning reference signal transmission. Alternatively, such exemplary determining operation according to exemplary embodiments of the present invention may comprise an operation of receiving, from said access node, an indication that said access node is ready to resume said positioning reference signal transmission. Alternatively, such exemplary determining operation according to exemplary embodiments of the present invention may comprise an operation of perceiving that a suspension interval associated with said suspended positioning reference signal transmission is expired.

According to a variation of the procedure shown in FIG. 7, said positioning reference signal transmission using said first positioning reference signal resource is related to a one-shot location service request of a positioning client node requesting said location determination of said location determination target. According to such variation, exemplary details of the determining operation (determining whether said resumption condition is fulfilled) are given, which are inherently independent from each other as such. Such exemplary determining operation according to exemplary embodiments of the present invention may comprise an operation of receiving a further one-shot location service request requesting said location determination of said location determination target.

According to a variation of the procedure shown in FIG. 7, exemplary additional operations are given, which are inherently independent from each other as such. According to such variation, an exemplary method according to exemplary embodiments of the present invention may comprise an operation of storing, upon reception of a first one-shot location service request requesting said location determination of said location determination target, positioning session context information in relation to said location determination of said location determination target, and an operation of utilizing, upon reception of a second one-shot location service request as said further one-shot location service request requesting said location determination of said location determination target, said positioning session context information in relation to said location determination of said location determination target.

According to exemplary embodiments of the present invention, said first and/or second positioning reference signal resource is identified by at least one of a positioning reference signal resource set, a set of positioning reference signal resource identifiers, a positioning reference signal beam identifier, a set of positioning reference signal beam identifiers, a transmission reception point identifier, a set of transmission reception point identifiers, a cell identifier, a set of cell identifiers, a synchronization signal block, a quasi co-location source, a synchronization signals and physical broadcast channel block, a set of synchronization signals and physical broadcast channel blocks.

According to exemplary embodiments of the present invention, said location service control entity is a location management function entity.

Figure 3:
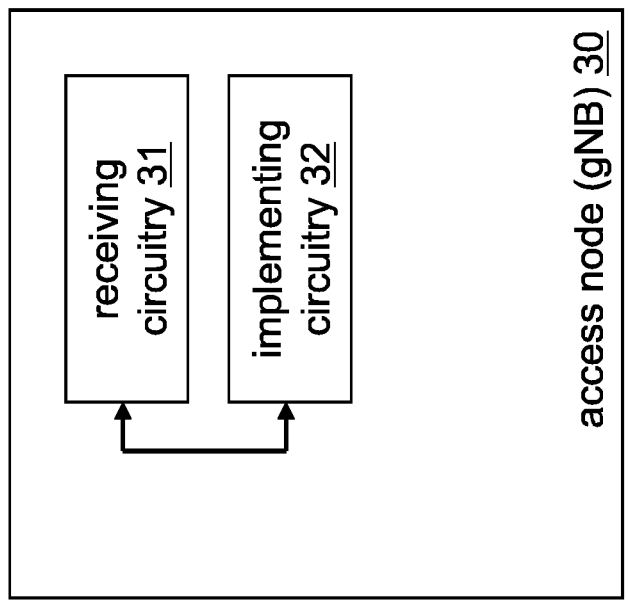
FIG. 3 is a block diagram illustrating an apparatus according to exemplary embodiments of the present invention.
Figure 8:
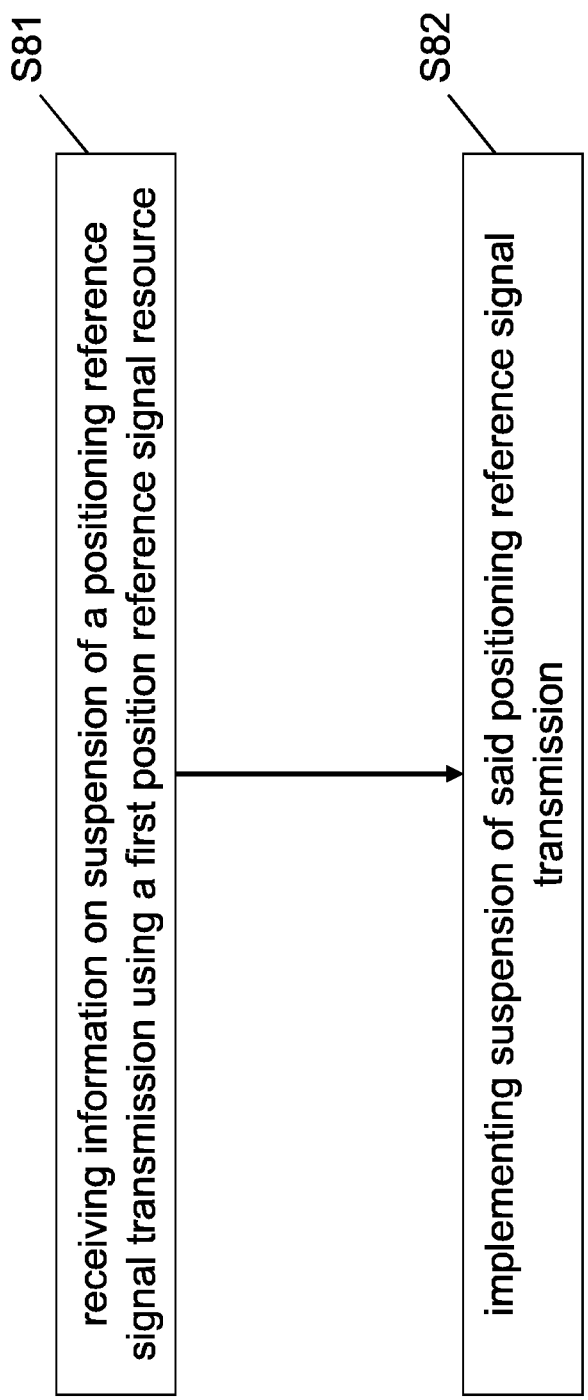
FIG. 8 is a schematic diagram of a procedure according to exemplary embodiments of the present invention.

FIG. 3 is a block diagram illustrating an apparatus according to exemplary embodiments of the present invention. The apparatus may be an access node 30 such as a base station such as a gNodeB (of a mobile network providing positioning reference signals for location determination, the access node supplying at least one location determination target with positioning reference signal transmission using a first positioning reference signal resource) comprising a receiving circuitry 31 and an implementing circuitry 32. The receiving circuitry 31 receives information on suspension of said positioning reference signal transmission using said first position reference signal resource. The implementing circuitry 32 implements suspension of said positioning reference signal transmission. FIG. 8 is a schematic diagram of a procedure according to exemplary embodiments of the present invention. The apparatus according to FIG. 3 may perform the method of FIG. 8 but is not limited to this method. The method of FIG. 8 may be performed by the apparatus of FIG. 3 but is not limited to being performed by this apparatus.

As shown in FIG. 8, a procedure according to exemplary embodiments of the present invention comprises an operation of receiving (S81) information on suspension of said positioning reference signal transmission using said first position reference signal resource, and an operation of implementing (S82) suspension of said positioning reference signal transmission.

Figure 4:
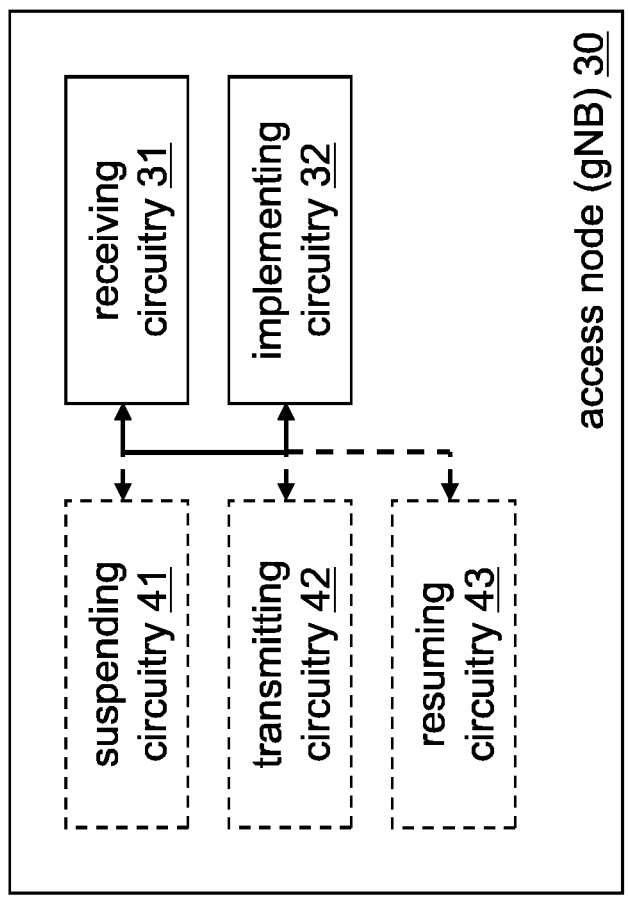
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise a suspending circuitry 41, a transmitting circuitry 42, and/or a resuming circuitry 43.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 8, said information on suspension is a configuration message, from a location service control entity, to suspend said positioning reference signal transmission. According to such variation, exemplary details of the implementing operation (implementing said suspension) are given, which are inherently independent from each other as such. Such exemplary implementing operation according to exemplary embodiments of the present invention may comprise an operation of suspending said positioning reference signal transmission.

According to a variation of the procedure shown in FIG. 8, said information on suspension is a configuration message, from a location service control entity, to suspend said positioning reference signal transmission upon expiry of a validity timer associated with a continuous location service request of a positioning client node requesting said location determination of said location determination target. According to such variation, exemplary details of the implementing operation (implementing said suspension) are given, which are inherently independent from each other as such. Such exemplary implementing operation according to exemplary embodiments of the present invention may comprise an operation of suspending said positioning reference signal transmission upon expiry of said validity timer.

According to a variation of the procedure shown in FIG. 8, said information on suspension is an indication, from said location determination target, to suspend said positioning reference signal transmission, or is an indication, from said location determination target, that said location determination target does not utilize said positioning reference signal transmission. According to such variation, exemplary details of the implementing operation (implementing said suspension) are given, which are inherently independent from each other as such. Such exemplary implementing operation according to exemplary embodiments of the present invention may comprise an operation of transmitting, to a location service control entity, an indication that said access node is ready to suspend said positioning reference signal transmission, an operation of receiving, from said location service control entity, grant of suspension of said positioning reference signal transmission, and an operation of suspending said positioning reference signal transmission.

According to a variation of the procedure shown in FIG. 8, exemplary additional operations and exemplary details of the implementing operation (implementing said suspension) are given, which are inherently independent from each other as such. According to such variation, an exemplary method according to exemplary embodiments of the present invention may comprise an operation of receiving, from a location service control entity, a pre-configuration on suspension of said positioning reference signal transmission. Further, according to such variation, said information on suspension is an indication, from said location determination target, to suspend said positioning reference signal transmission, or is an indication, from said location determination target, that said location determination target does not utilize said positioning reference signal transmission. Furthermore, such exemplary implementing operation according to exemplary embodiments of the present invention may comprise an operation of suspending said positioning reference signal transmission based on said pre-configuration and said indication from said location determination target.

According to a variation of the procedure shown in FIG. 8, exemplary additional operations are given, which are inherently independent from each other as such. According to such variation, an exemplary method according to exemplary embodiments of the present invention may comprise an operation of receiving information on resumption of said positioning reference signal transmission, and an operation of implementing resumption of said positioning reference signal transmission.

According to a variation of the procedure shown in FIG. 8, said information on resumption is a configuration message, from a location service control entity, to resume said positioning reference signal transmission using said first positioning reference signal resource. According to such variation, exemplary details of the implementing operation (implementing said resumption) are given, which are inherently independent from each other as such. Such exemplary implementing operation according to exemplary embodiments of the present invention may comprise an operation of resuming said positioning reference signal transmission using said first positioning reference signal resource.

According to a variation of the procedure shown in FIG. 8, said information on resumption is a configuration message, from a location service control entity, to resume said positioning reference signal transmission using a second positioning reference signal resource different from said first positioning reference signal resource. According to such variation, exemplary details of the implementing operation (implementing said resumption) are given, which are inherently independent from each other as such. Such exemplary implementing operation according to exemplary embodiments of the present invention may comprise an operation of resuming said positioning reference signal transmission using said second positioning reference signal resource.

According to a variation of the procedure shown in FIG. 8, said information on resumption is an indication, from said location determination target, to resume said positioning reference signal transmission. According to such variation, exemplary details of the implementing operation (implementing said resumption) are given, which are inherently independent from each other as such. Such exemplary implementing operation according to exemplary embodiments of the present invention may comprise an operation of transmitting, to a location service control entity, an indication that said access node is ready to resume said positioning reference signal transmission, an operation of receiving, from said location service control entity, grant of resumption of said positioning reference signal transmission, and an operation of resuming said positioning reference signal transmission.

According to a variation of the procedure shown in FIG. 8, said information on resumption is a configuration message, from a location service control entity, to suspend said positioning reference signal transmission, the configuration message including a suspension interval associated with said suspended positioning reference signal transmission. According to such variation, exemplary details of the implementing operation (implementing said resumption) are given, which are inherently independent from each other as such. Such exemplary implementing operation according to exemplary embodiments of the present invention may comprise an operation of resuming said positioning reference signal transmission upon expiry of said suspension interval.

According to exemplary embodiments of the present invention, said first and/or second positioning reference signal resource is identified by at least one of a positioning reference signal resource set, a set of positioning reference signal resource identifiers, a positioning reference signal beam identifier, a set of positioning reference signal beam identifiers, a transmission reception point identifier, a set of transmission reception point identifiers, a cell identifier, a set of cell identifiers, a synchronization signal block, a quasi co-location source, a synchronization signals and physical broadcast channel block, a set of synchronization signals and physical broadcast channel blocks.

According to exemplary embodiments of the present invention, said access node is a gNodeB.

Figure 5:
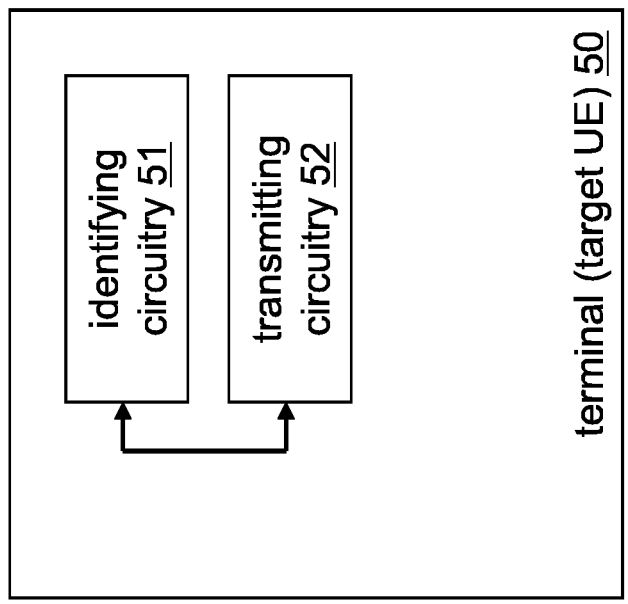
FIG. 5 is a block diagram illustrating an apparatus according to exemplary embodiments of the present invention.
Figure 9:
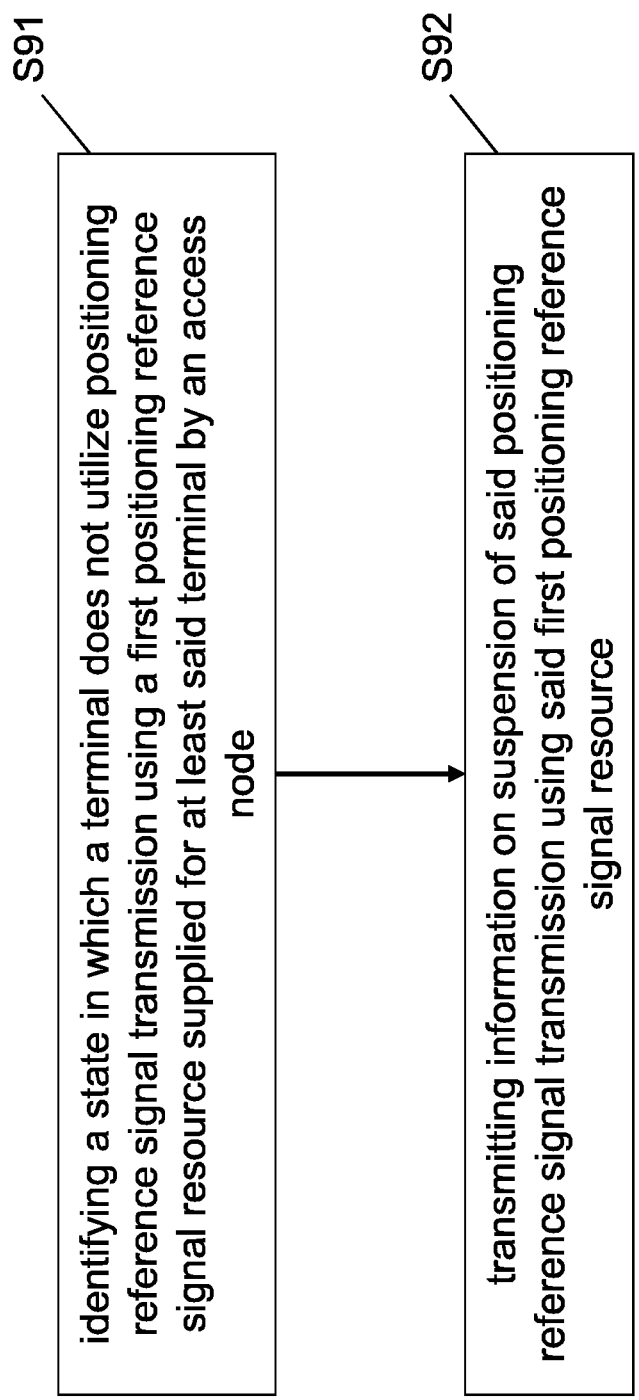
FIG. 9 is a schematic diagram of a procedure according to exemplary embodiments of the present invention.
Figure 10:
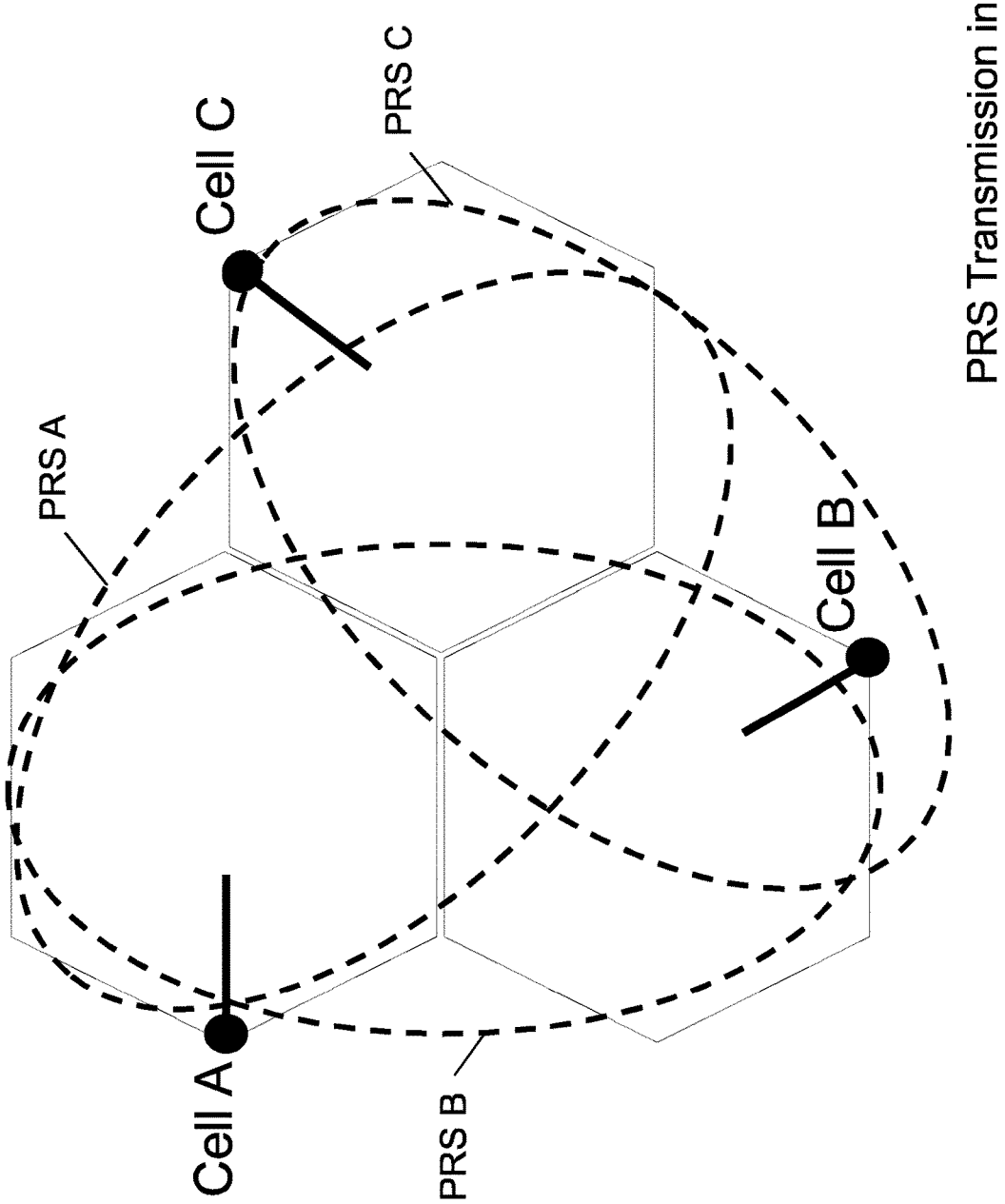
FIG. 10 shows a schematic diagram of an example of a system environment for positioning reference signal transmissions in an LTE scenario.
Figure 11:
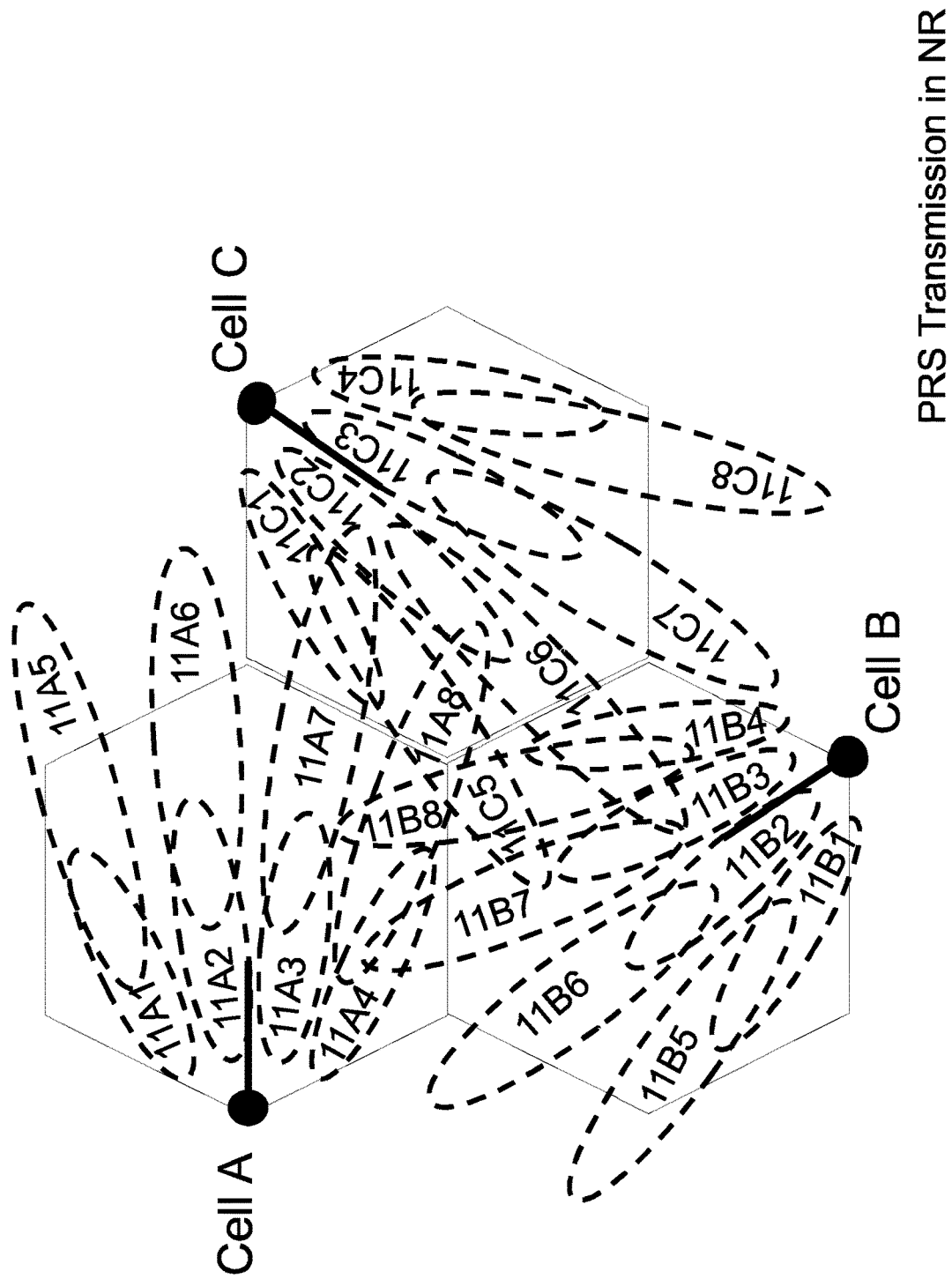
FIG. 11 shows a schematic diagram of an example of a system environment for positioning reference signal transmissions in an NR scenario.

FIG. 5 is a block diagram illustrating an apparatus according to exemplary embodiments of the present invention. The apparatus may be a terminal 50 such as a user equipment such as a target UE (in a mobile network providing positioning reference signals for location determination) comprising an identifying circuitry 51 and a transmitting circuitry 52. The identifying circuitry 51 identifies a state in which said terminal does not utilize positioning reference signal transmission using a first positioning reference signal resource supplied for at least said terminal by an access node. The transmitting circuitry 52 transmits information on suspension of said positioning reference signal transmission using said first positioning reference signal resource. FIG. 9 is a schematic diagram of a procedure according to exemplary embodiments of the present invention. The apparatus according to FIG. 5 may perform the method of FIG. 9 but is not limited to this method. The method of FIG. 9 may be performed by the apparatus of FIG. 5 but is not limited to being performed by this apparatus.

As shown in FIG. 9, a procedure according to exemplary embodiments of the present invention comprises an operation of identifying (S91) a state in which said terminal does not utilize positioning reference signal transmission using a first positioning reference signal resource supplied for at least said terminal by an access node, and an operation of transmitting (S92) information on suspension of said positioning reference signal transmission using said first positioning reference signal resource.

Figure 6:
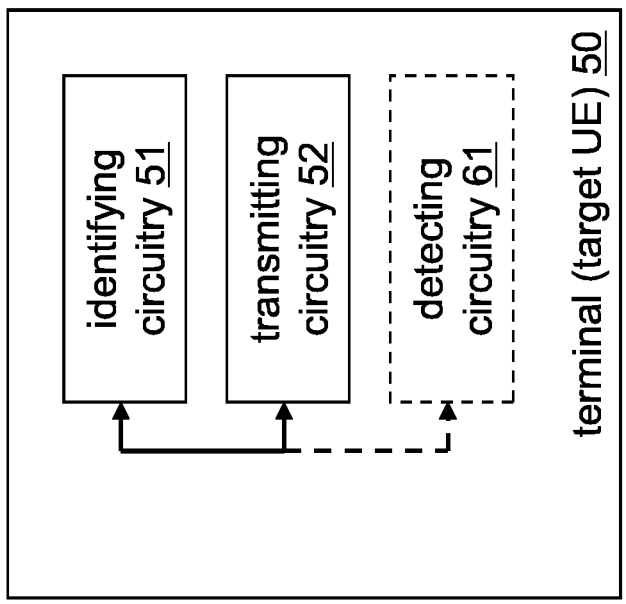
FIG. 6 is a block diagram illustrating an apparatus according to exemplary embodiments of the present invention.

FIG. 6 is a block diagram illustrating an apparatus according to exemplary embodiments of the present invention. In particular, FIG. 6 illustrates a variation of the apparatus shown in FIG. 5. The apparatus according to FIG. 6 may thus further comprise a detecting circuitry 61.

In an embodiment at least some of the functionalities of the apparatus shown in FIG. 5 (or 6) may be shared between two physically separate devices forming one operational entity. Therefore, the apparatus may be seen to depict the operational entity comprising one or more physically separate devices for executing at least some of the described processes.

According to exemplary embodiments of the present invention, said information on suspension is an indication, to said access node, to suspend said positioning reference signal transmission. Alternatively, according to exemplary embodiments of the present invention, said information on suspension is an indication, to a location service control entity, to suspend said positioning reference signal transmission. Alternatively, according to exemplary embodiments of the present invention, said information on suspension is an indication, to said access node, that said terminal does not utilize said positioning reference signal transmission. Alternatively, according to exemplary embodiments of the present invention, said information on suspension is an indication, to said location service control entity, that said terminal does not utilize said positioning reference signal transmission.

According to exemplary embodiments of the present invention, non-indication of any positioning reference signal resource is indicative of all positioning reference signal resources including said first positioning reference signal resource.

According to exemplary embodiments of the present invention, said information on suspension includes periodicity information indicative of a required transmission interval of said positioning reference signal transmission.

According to a variation of the procedure shown in FIG. 9, exemplary details of the identifying operation (said identifying said state) are given, which are inherently independent from each other as such.

Such exemplary identifying operation according to exemplary embodiments of the present invention may comprise an operation of detecting that reception of said first positioning reference signal resource is blocked.

According to a variation of the procedure shown in FIG. 9, exemplary additional operations are given, which are inherently independent from each other as such. According to such variation, an exemplary method according to exemplary embodiments of the present invention may comprise an operation of identifying a state in which said terminal requires said positioning reference signal transmission, and an operation of transmitting information on resumption of said positioning reference signal transmission.

According to exemplary embodiments of the present invention, said information on resumption is an indication, to said access node, to resume said positioning reference signal transmission. Alternatively, according to exemplary embodiments of the present invention, said information on resumption is an indication, to a location service control entity, to resume said positioning reference signal transmission.

According to exemplary embodiments of the present invention, said first positioning reference signal resource is identified by at least one of a positioning reference signal resource set, a set of positioning reference signal resource identifiers, a positioning reference signal beam identifier, a set of positioning reference signal beam identifiers, a transmission reception point identifier, a set of transmission reception point identifiers, a cell identifier, a set of cell identifiers, a synchronization signal block, a quasi co-location source, a synchronization signals and physical broadcast channel block, a set of synchronization signals and physical broadcast channel blocks.

According to exemplary embodiments of the present invention, said terminal is a target user equipment for said location determination.

In other words, according to exemplary embodiments of the present invention, a method for managing dynamic PRS transmissions from the network is provided. In particular, the provided method defines network-side and UE-side functionalities which suspend the transmission of PRS under certain conditions, targeting an efficient resource usage.

Network side functionality according to the concept of the present invention is summarized in other words as follows.

According to exemplary embodiments of the present invention, dynamic PRS transmission is enhanced with a suspend and resume mechanism.

Heretofore, the gNodeB (gNB, i.e. a base station) behaves as follows, following a configuration by the location management function (LMF).

According to such embodiments, the gNB may suspend the transmission of PRS over given PRS resources (i.e. PRS resource sets, PRS resources/beam IDs or resource sets associated with ID uniquely identify PRS resource, transmission reception point (TRP, Tx/Rx point) ID, cell ID, PRS associated to specific SSB or channel state information reference signal (CSI-RS)), if given conditions (suspension conditions)) are satisfied.

In addition, according to such embodiments, the gNB may resume transmission of PRS over the same or other specified PRS resources/resource sets/PRS resource beam IDs, if there is an indication to resume the location service to the same or other PRS resources.

According to such embodiments, further, the network may determine the PRS transmission configuration based on UE indications whether the UE(s) is(are) using the specified resources.

According to alternative embodiments, the gNB may indicate to the LMF that it may suspend specific PRS resources/resource sets. This indication may preferably be based on an indication of at least one UE. As a response, the LMF may grant gNB to suspend the transmission of specific PRS.

UE side functionality according to the concept of the present invention is summarized in other words as follows.

According to exemplary embodiments of the present invention, a UE can be configured to provide suspend and resume (deactivation/activation) indication for PRS transmissions (i.e. PRS resources or resource sets). The suspend message provides the network an indication that UE is currently not using one or more or any of PRS resources for positioning.

According to such embodiments, the UE may be configured to conduct suspend/resume signaling with the base station (cell, serving cell, gNB), to conduct suspend/resume signaling with the LMF, or to conduct suspend/resume signaling with both.

According to such embodiments, further, in a transmitted suspend message, the UE may provide indication to the network (either LMF/gNB) that it is currently not using one or more PRS resources for positioning, thereby enabling the network to (temporarily) cease/suspend transmission of the given PRS resource for that specific UE.

According to such embodiments, the indication may include in the suspend message and in the indication to suspend a PRS resource, a PRS resource set, a TRP ID or a set of TRP IDs (to suspend the associated PRS) or a cell or cells (to suspend the associated PRS).

In some embodiments, a QCL property may be indicated between a target and a source RS signal. When a target signal and source signal are said to, is configured to or indicated to be QCL'd, this means that they share the same property. As an example, different QCL types/properties may be indicated for target and source (or for first reference signal and second reference signal) such as average delay, Doppler shift or spatial RX parameter (typeD QCL). TypeD or the spatial RX parameter indicates that UE may receive the QCL'd signals using the same RX beam or spatial filter. A reference signal may have one or more QCL source signals providing different QCL type property. For example, PRS and SSB may be QCL'd with typeD and from UE perspective it may receive the signals using the same RX beam. As a further example, the 3GPP TS 38.214 (5.1.5 "Antenna ports quasi co-location") states following on the QCL types:

The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

According to such embodiments, further, the suspend indication may include an indication of the quasi co-location (QCL) source for the PRS. That is, in the suspend request, the UE may indicate one or more synchronization signals and physical broadcast channel (SS/PBCH) blocks to indicate to suspend the PRS associated with the synchronization signal block (SSB). Alternatively or additionally, the UE may indicate one or more CSI-RS (NZP-CSI-RS and/or L3 Mobility CSI-RS) to suspend the PRS associated with the CSI-RS.

According to such embodiments, further, the UE may be configured/indicated with a set of PRS resources for positioning purposes and the UE may then select only a subset of the resources for positioning measurements. Thus, the UE may provide to the network an indication that the network may choose to suspend the transmission of one or more PRS based on the UE indication.

According to such embodiments, further, the UE may provide to the network the suspend indication (with or without any additional suspend information). When the suspend information is not present or when it indicates to suspend all PRS, this indicates to the network that the UE is currently not using any of the PRS for positioning purposes until it sends a resume request/indication.

According to further exemplary embodiments of the present invention, the suspend/resume request sent by the UE may also include periodicity information. Here, the UE may indicate to the network that it requires PRS transmission by network with/at specific intervals. As an example, the UE may have an application/service that requires a location update with certain intervals (e.g. 1 minute). In such case, according to exemplary embodiments of the present invention, the UE may indicate to the network that the network may suspend the PRS transmission for the given time between the positioning measurements. In one example, with 1 minute intervals, the network may activate the PRS e.g. 5/10 seconds prior to the 1 minute interval (or 1 or 2 or N PRS cycles prior to the interval). In one example, the periodicity information may be indicated by the UE per PRS resource basis (e.g. each PRS resource may be requested to be provided with specific periodicity), per one or more resource set basis or all configured or provided PRS.

According to further exemplary embodiments of the present invention, in a resume message, the UE may request a set of pre-configured PRS resources to be activated or resumed by the network.

Exemplary embodiments of the present invention are now described in more specific terms.

Namely, according to exemplary embodiments of the present invention, the PRS suspend mechanism is triggered when the continuity of the positioning session is interrupted.

Here, exemplary embodiments related to continuous location services and related to one-shot location services are provided.

In particular, according to such exemplary embodiments related to continuous location services, the location service (LCS) request is designated as conditionally continuous. This means that the positioning client node (which can be, for instance, a 5G core LCS entity, the target UE, or another UE), designates that the coordinates of the target UE should be provided to the client node in a specified manner (e.g., periodically with specified periodicity), unless a condition for continuity suspension is satisfied.

According to such exemplary embodiments of the present invention, a first condition for continuity suspension is that a validity timer is assigned to the LCS request. That is, contrary to existing approaches, when an LCS request is generated by the positioning client node, the time for which the location service is requested is specified together with the target UE of interest. The LCS service is then suspended when the validity timer expires.

According to such exemplary embodiments of the present invention, a second condition for continuity suspension is that the positioning client node instigates an LCS suspend message to the location server (for NR, the location server is the location management function—LMF).

According to such exemplary embodiments of the present invention, a third condition for continuity suspension is that the UE instigates an indication to suspend the PRS transmission for a given LCS.

According to the exemplary embodiments related to continuous location services, the network continuously transmits PRS resources associated with the conditionally continuous LCS service, until one of the above continuity suspension conditions (i.e., the validity timer is expired or LCS suspend message is received by network or UE) is satisfied. If such conditions are met, the PRS suspend mechanism is triggered and thus PRS transmission is suspended.

According to such exemplary embodiments of the present invention, the UE suspend/resume request may be transmitted as a message to the LMF or to the gNB. If the suspend/resume is implemented as message to the LMF, the LMF indicates to the gNB or set of gNBs/cells to activate deactivate the PRS. If the request message is implemented as a message to the gNB, the gNB may indicate the request to the LMF, or alternatively, based on a PRS configuration received from the LMF, the gNB determines whether the suspend-requested resources are not configured for other UEs, and if so, it may suspend the transmission.

According to the exemplary embodiments related to continuous location services, a PRS resume mechanism may be implemented as follows.

Namely, assuming that the PRS transmission has been suspended based on the above conditions (first, second, third condition), the PRS transmission is restored from the last suspended status when a restore-continuous-LCS-service message arrives to the location server.

According to exemplary embodiments related to one-shot location services, the LCS request is designated as LCS stand-by with termination conditions. This means that once the location server (e.g., LMF) receives a request by a positioning client node (e.g., UE or 5G Core) about a target UE, the location server will provide the coordinates of the UE as one-shot to the client, but will also store the positioning session context information (e.g., UE capabilities, PRS configuration, etc.). The location server will remain in a stand-by mode, waiting for a next LCS request for the same target UE. As a result, the location server does not need to repeat the initialization process for a positioning session of a recently positioned UE, unless it is designated that the position session for this target UE is terminated.

According to such exemplary embodiments of the present invention, together with the LCS request, the client node designates the positioning service as LCS stand-by.

According to such exemplary embodiments of the present invention, further, if the location server is in LCS stand-by mode for a target UE, when a new request for this UE arrives, the location server skips the initialization steps of the positioning process (e.g., request UE capabilities).

According to such exemplary embodiments of the present invention, further, the location server discards the positioning context of a target UE upon reception of a session termination message instigated by client node.

According to the exemplary embodiments related to one-shot location services, the network suspends PRS upon reception of the coordinates of the target UE. Thus, the PRS suspension mechanism is triggered by reception of the coordinates of the UE. The network stores the per-target-UE dynamic PRS information such that it can resume the PRS transmission when a new request for this target UE arrives.

According to the exemplary embodiments related to one-shot location services, a PRS resume mechanism may be implemented as follows.

The PRS transmission is restored to the stored per-target-UE dynamic PRS information when a new request for a target UE with an LCS stand-by service is received.

According to exemplary embodiments of the present invention, the UE (target UE) may transmit suspend/resume requests/indications to the network based on the following triggers.

On the one hand, the UE may determine that reception of specific PRS resources is blocked (i.e. the reception (RX) beam used for the reception of specific PRS is blocked) and it may indicate to the network to suspend the set corresponding to the blocked RX beam and indicate to resume or to activate another set that has been preconfigured.

The panel/RX beam specific blocking may cause the UE to indicate suspension for a set of PRS and may trigger updated measurements on the new candidates for PRS transmission.

According to exemplary embodiments of the present invention, the UE may determine blocking based on PRS RSRP or based on the SSB/CSI-RS reference signal received power (RSRP) that is a QCL source for a PRS signal.

On the one hand, the UE may provide an indication when it is not actively trying to locate itself currently which would allow the network to suspend the PRS transmission. Once the UE needs the location information, the UE requests resumption. The suspend/resume pauses and continues the positioning session/service without de-configuration/reconfiguration.

Further, the UE may be triggered to indicate suspension to the network, when the UE is not using on-demand/dynamically configured PRS currently for positioning. The UE may indicate one or more configured PRS resources.

Exemplary embodiments of the present invention are now described in more detail with reference to FIGS. 14, 15, 16 and 17.

FIGS. 14 to 17 respectively show schematic diagrams of signaling sequences according to exemplary embodiments of the present invention.

Figure 14:
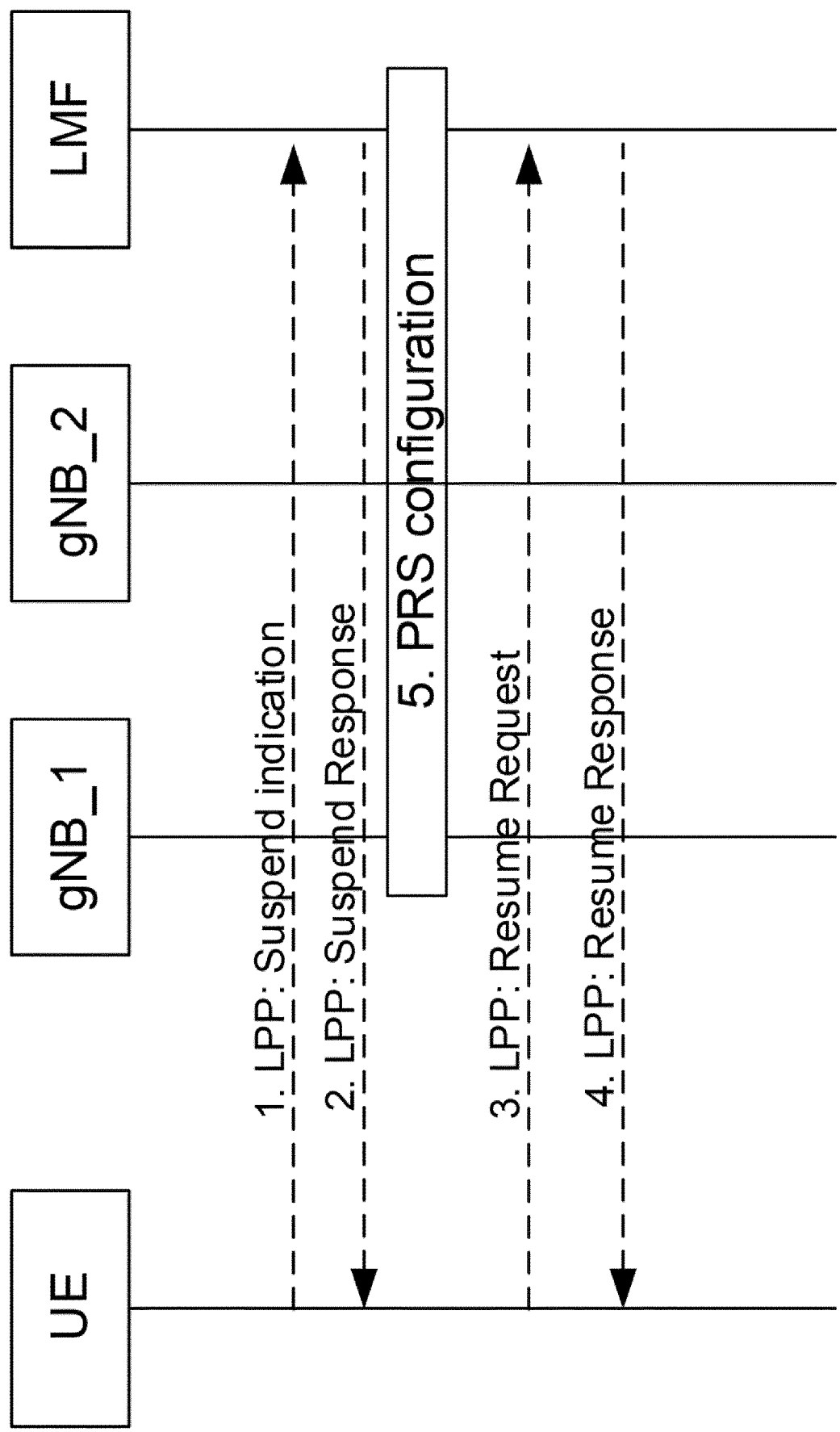
FIG. 14 shows a schematic diagram of signaling sequences according to exemplary embodiments of the present invention.

In particular, FIG. 14 illustrates LTE Positioning Protocol (LPP) signaling between a UE and an LMF. In particular, the UE conducts suspend/resume signaling with LMF using the LPP protocol.

Figure 15:
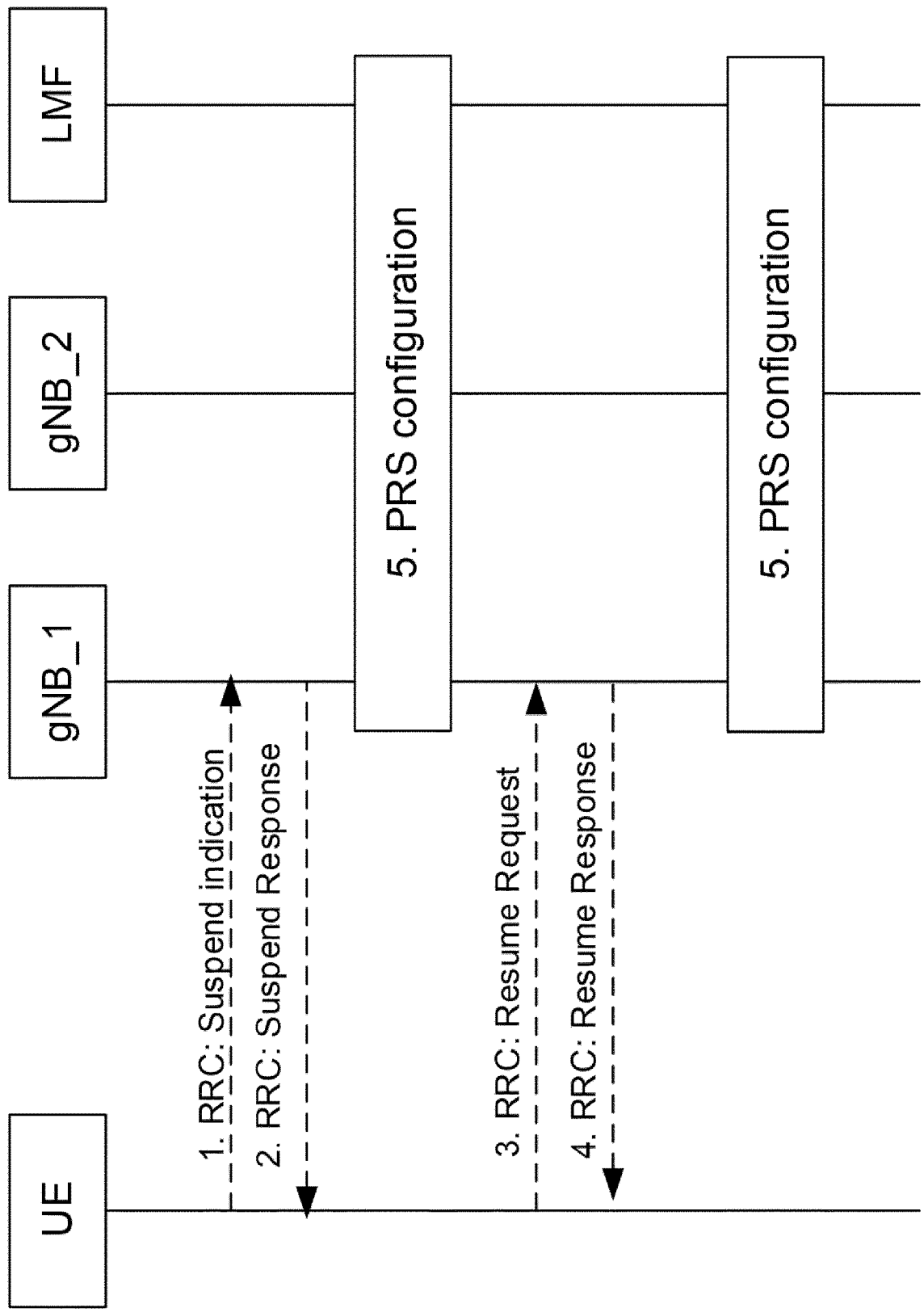
FIG. 15 shows a schematic diagram of signaling sequences according to exemplary embodiments of the present invention.

Further, FIG. 15 illustrates suspend/resume signaling (radio access network (RAN) signaling) between a UE and a gNB using radio resource control (RRC).

Figure 16:
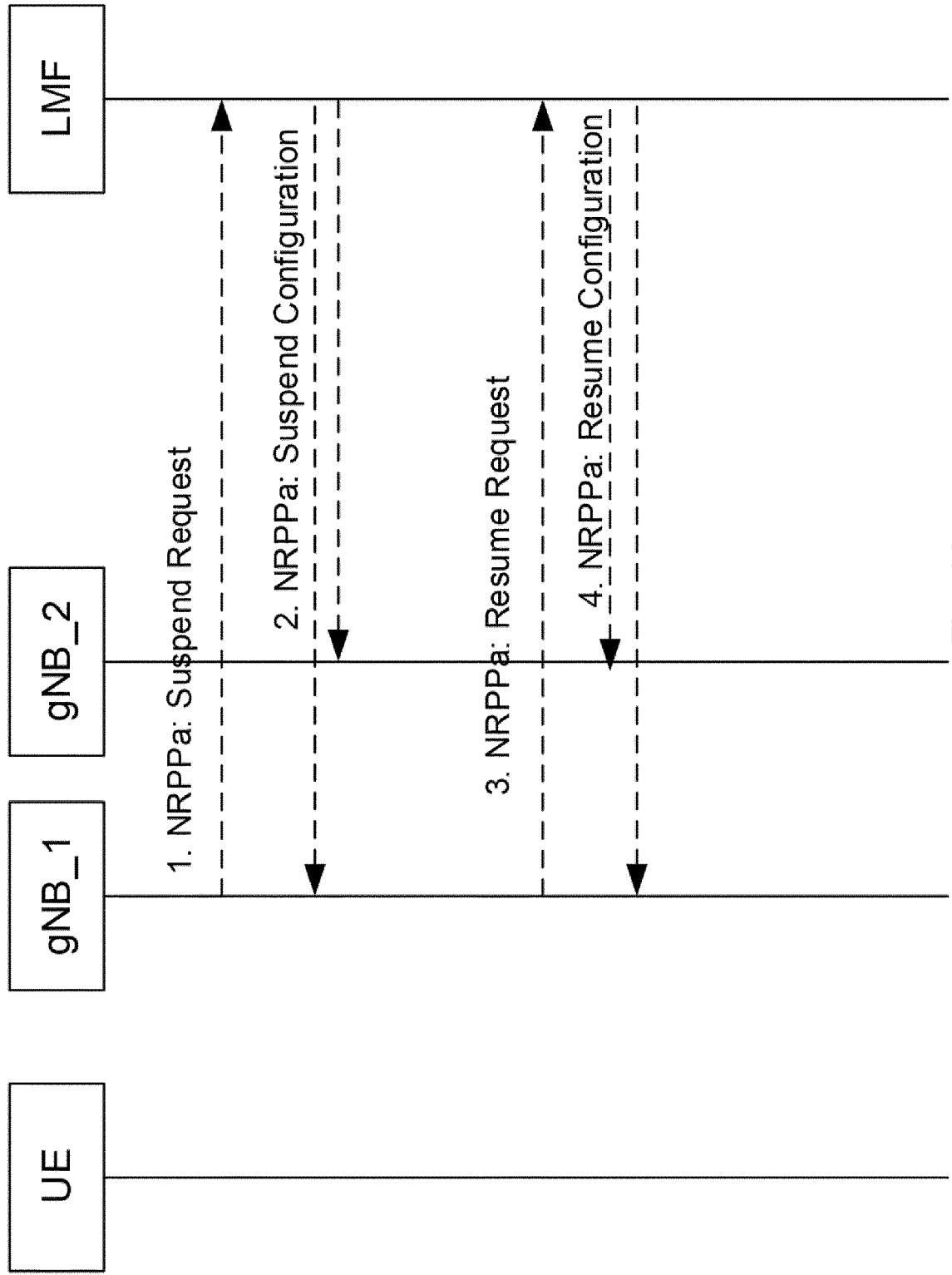
FIG. 16 shows a schematic diagram of signaling sequences according to exemplary embodiments of the present invention.

Further, FIG. 16 illustrates a gNB originated suspend indication or request to the LMF.

Figure 17:
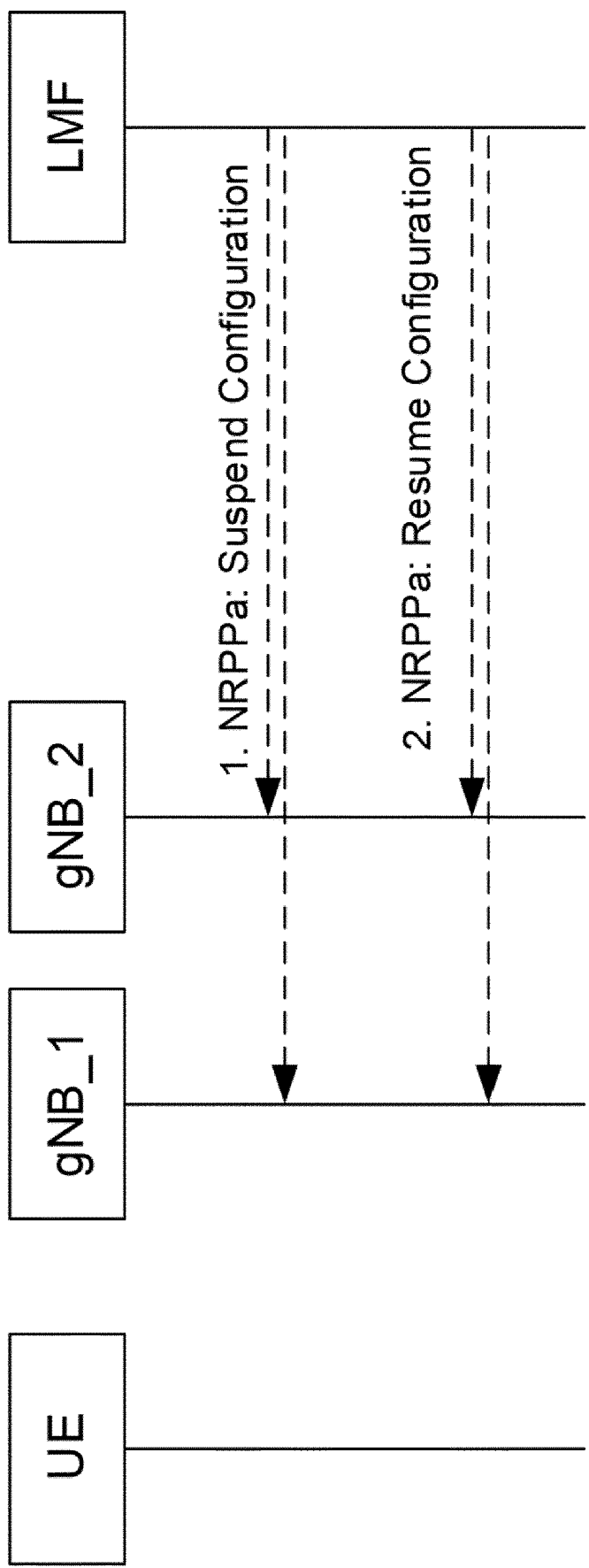
FIG. 17 shows a schematic diagram of signaling sequences according to exemplary embodiments of the present invention.

Finally, FIG. 17 illustrates an LMF originated suspend/resume for a PRS transmission.

With reference to FIG. 14, according to exemplary embodiments of the present invention, first, the UE transmits an LPP: Suspend Indication to the LMF. The indication may be an LPP message (or the suspend information may be included in the existing or new message such as UEassistanceInformation). In the suspend indication or message, the UE provides LMF information as described herein (e.g. direct or indirect information which PRS UE is not measuring/using/able to receive/receiving currently). According to exemplary embodiments of the present invention, the UE may also provide further information such as a suspend interval (e.g. the periodicity/interval request for PRS transmission).

According to exemplary embodiments of the present invention, second, the network may respond with an LPP: Suspend Response. This message may be optional or it may be used as a confirmation message from the LPP or it may provide the UE with further information, e.g. an indication how long the PRS are suspended (i.e., in such case the UE is not required to request resume as the PRS would be resumed after expiry of the time interval). The network may or may not transmit the LPP: Suspend Response, i.e., the UE may provide an indication that it may not use specific PRS resources and the network may or may not act upon the indication. The UE suspend indication may cause the network (LMF) to reconfigure the PRS transmission of one or more gNBs.

According to exemplary embodiments of the present invention, third, the UE may request the network to resume the PRS transmission or PRS transmission configuration it had previously, i.e., the configuration it indicated to suspend, with an LPP: Resume Request. According to exemplary embodiments of the present invention, the UE may be configured to provide updated measurements on either PRS resources or the candidate beams (e.g. SSBs/CSI-RS that can be used to transmit PRS) to the LMF.

According to exemplary embodiments of the present invention, fourth, with an LPP: Resume Response, the network either confirms the UE resume request, rejects it, or it may provide UE with new/updated PRS configuration. According to exemplary embodiments of the present invention, the network may indicate in the resume response when the UE can assume that the new/resumed PRS configuration is active.

According to exemplary embodiments of the present invention, fifth, the network may perform the PRS configuration in between or after each of the first to fourth step/steps. As such, the PRS configuration between the second and third steps as illustrated in FIG. 14 is a non-limiting implementation option according to exemplary embodiments of the present invention.

With reference to FIG. 15, according to exemplary embodiments of the present invention, the signaling as described with reference to FIG. 14 may alternatively be conducted between the UE and a gNB using RRC.

Here, according to exemplary embodiments of the present invention, the gNB is either determining by itself which PRS transmission it may or may not suspend (e.g. based on a UE'S indication), and/or it may signal the PRS suspend related information with neighbor gNBs to coordinate which resources could be suspended. Alternatively, or additionally, the gNB may further exchange information/request suspension of PRS from LMF. According to exemplary embodiments of the present invention, the network may indicate in the resume response when the UE can assume that the new/resumed PRS configuration is active.

With reference to FIG. 16, according to exemplary embodiments of the present invention, the network suspend/resume signaling corresponds to a gNB originated suspend request via NR Positioning Protocol A (NRPPa). The gNB may request suspension of PRS resources e.g. based on a UE's indication, or based on an indication by another gNB, or to request more scheduling flexibility for data.

According to exemplary embodiments of the present invention explained with reference to FIG. 16, first, one or more gNBs may request to suspend transmission of one or more PRS. The request is sent to the LMF using NRPPa.

According to exemplary embodiments of the present invention, second, as a response, the LMF provides the gNB or gNBs with a suspend configuration. The configuration may include timer based suspension of PRS transmission for a specific resource for the duration of the timer or until a corresponding session is resumed. The network may also de-configure the PRS instead of suspending the same.

According to exemplary embodiments of the present invention, third, one or more gNBs may transmit (a) resume request(s) for a previously suspended PRS configuration. Alternatively, the resume request may include a request to resume PRS transmission with a new configuration.

According to exemplary embodiments of the present invention, fourth, as a response, the LMF may grant the resume of PRS transmission or grant the resume of PRS transmission with a new configuration.

With reference to FIG. 17, according to exemplary embodiments of the present invention, the LMF may command suspend/resume for PRS transmission for one or more gNB(s) (LMF originated signaling).

The LMF may request to suspend a specific resource e.g. based on a UE's indication or knowledge of UE positioning sessions.

According to exemplary embodiments of the present invention explained with reference to FIG. 17, first, the LMF may request one or more gNB(s) to suspend the transmission of PRS until it is resumed or until a timer expires.

According to exemplary embodiments of the present invention, second, the LMF may indicate to one or more gNB(s) to resume the transmission of PRS as previously configured or with a new/updated configuration.

Exemplary embodiments of the present invention enable more scheduling flexibility for the network, as the network can opportunistically, e.g. based on a UE's indication, suspend the transmission of PRS for specific beams, i.e., the network may use the spatial resources to schedule other UEs or schedule data for the given UE. In addition, exemplary embodiments of the present invention achieve network power saving, since the network is able for DTX of specific PRS resources.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 18:
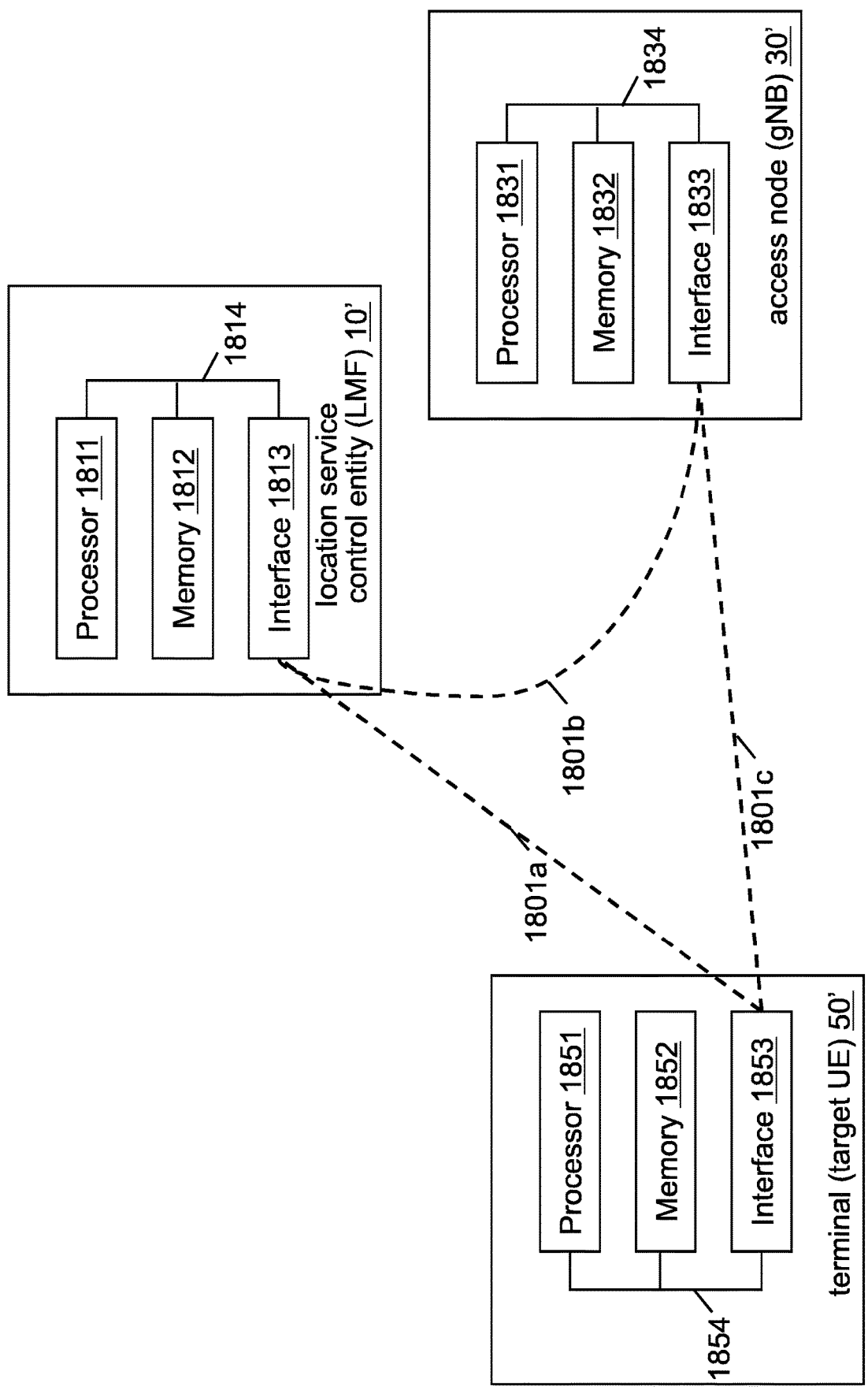
FIG. 18 is a block diagram alternatively illustrating apparatuses according to exemplary embodiments of the present invention.

In FIG. 18, an alternative illustration of apparatuses according to exemplary embodiments of the present invention is depicted. As indicated in FIG. 18, according to exemplary embodiments of the present invention, the apparatus (location service control entity) 10' (corresponding to the location service control entity 10) comprises a processor 1811, a memory 1812 and an interface 1813, which are connected by a bus 1814 or the like. Further, according to exemplary embodiments of the present invention, the apparatus (access node) 30' (corresponding to the access node 30) comprises a processor 1831, a memory 1832 and an interface 1833, which are connected by a bus 1834 or the like. Further, according to exemplary embodiments of the present invention, the apparatus (terminal) 50' (corresponding to the terminal 50) comprises a processor 1851, a memory 1852 and an interface 1853, which are connected by a bus 1854 or the like. The apparatuses may be connected via links 1801a, 1801b, 1801c, respectively.

The processor 1811/1831/1851 and/or the interface 1813/1833/1853 may also include a modem or the like to facilitate communication over a (hardwire or wireless) link, respectively. The interface 1813/1833/1853 may include a suitable transceiver coupled to one or more antennas or communication means for (hardwire or wireless) communications with the linked or connected device(s), respectively. The interface 1813/1833/1853 is generally configured to communicate with at least one other apparatus, i.e. the interface thereof.

The memory 1812/1832/1852 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the location service control entity 10 (in a mobile network providing positioning reference signals for location determination) comprises at least one processor 1811, at least one memory 1812 including computer program code, and at least one interface 1813 configured for communication with at least another apparatus. The processor (i.e. the at least one processor 1811, with the at least one memory 1812 and the computer program code) is configured to perform deciding to suspend positioning reference signal transmission using a first positioning reference signal resource (thus the apparatus comprising corresponding means for deciding), and to perform configuring, upon a result of said deciding to suspend said positioning reference signal transmission, an access node supplying at least one location determination target with said positioning reference signal transmission using said first positioning reference signal resource, to suspend said positioning reference signal transmission (thus the apparatus comprising corresponding means for configuring).

According to exemplary embodiments of the present invention, an apparatus representing the access node 30 (of a mobile network providing positioning reference signals for location determination, the access node supplying at least one location determination target with positioning reference signal transmission using a first positioning reference signal resource) comprises at least one processor 1831, at least one memory 1832 including computer program code, and at least one interface 1833 configured for communication with at least another apparatus. The processor (i.e. the at least one processor 1831, with the at least one memory 1832 and the computer program code) is configured to perform receiving information on suspension of said positioning reference signal transmission using said first position reference signal resource (thus the apparatus comprising corresponding means for receiving), and to perform implementing suspension of said positioning reference signal transmission (thus the apparatus comprising corresponding means for implementing).

According to exemplary embodiments of the present invention, an apparatus representing the terminal 50 (in a mobile network providing positioning reference signals for location determination) comprises at least one processor 1851, at least one memory 1852 including computer program code, and at least one interface 1853 configured for communication with at least another apparatus. The processor (i.e. the at least one processor 1851, with the at least one memory 1852 and the computer program code) is configured to perform identifying a state in which said terminal does not utilize positioning reference signal transmission using a first positioning reference signal resource supplied for at least said terminal by an access node (thus the apparatus comprising corresponding means for identifying), and to perform transmitting information on suspension of said positioning reference signal transmission using said first positioning reference signal resource (thus the apparatus comprising corresponding means for transmitting).

For further details regarding the operability/functionality of the individual apparatuses, reference is made to the above description in connection with any one of FIGS. 1 to 17, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for efficient provision of positioning reference signal transmissions. Such measures exemplarily comprise, at of a location service control entity in a mobile network providing positioning reference signals for location determination, deciding to suspend positioning reference signal transmission using a first positioning reference signal resource, and configuring, upon a result of said deciding to suspend said positioning reference signal transmission, an access node supplying at least one location determination target with said positioning reference signal transmission using said first positioning reference signal resource, to suspend said positioning reference signal transmission.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
AGV automated guided vehicle
CSI-RS channel state information reference signal
DTX discontinuous transmission
gNB gNodeB, NR/5G Node B
(I)IoT (industrial) internet-of-things
LCS location service
LMF location management function
LPP LTE Positioning Protocol
LTE Long Term Evolution
NR New Radio
NRPPa NR Positioning Protocol A
PRS positioning reference signal
QCL quasi co-location
RAN radio access network
RAT radio access technology
RRC radio resource control
RSRP reference signal received power
RX reception
SSB synchronization signal block
SS/PBCH synchronization signals and physical broadcast channel
TRP Tx/Rx point, transmission reception point
UE user equipment
V2X vehicle-to-X

The invention claimed is:

1. An apparatus of a location service control entity in a mobile network providing positioning reference signals for location determination, the apparatus comprising:
    at least one processor;
    at least one memory including computer program code; and
    at least one interface configured for communication with at least another apparatus,
    the at least one processor, with the at least one memory and the computer program code, being configured to cause the apparatus to perform:
    deciding to suspend positioning reference signal transmission using a first positioning reference signal resource, and
    configuring, upon a result of said deciding to suspend said positioning reference signal transmission, an access node supplying at least one location determination target with said positioning reference signal transmission using said first positioning reference signal resource, to suspend said positioning reference signal transmission,
    wherein
    the at least one processor, with the at least one memory and the computer program code, are configured to cause the apparatus to perform:
    determining whether a suspension condition to suspend said positioning reference signal transmission is fulfilled, wherein
    said deciding to suspend is based on whether said suspension condition is fulfilled,
    wherein said positioning reference signal transmission using said first positioning reference signal resource is related to a continuous location service request of a positioning client node requesting said location determination of said location determination target, and
    in relation to said determining whether said suspension condition is fulfilled, the at least one processor, with the at least one memory and the computer program code, being configured to cause the apparatus to perform:
    receiving, from said location determination target, an indication to suspend said positioning reference signal transmission, or
    receiving, from said location determination target, an indication that said location determination target does not utilize said positioning reference signal transmission, or
    receiving, from said positioning client node requesting said location determination of said location determination target, a suspend message indicating to suspend said positioning reference signal transmission, or
    receiving, from said access node, an indication that said access node is ready to suspend said positioning reference signal transmission, or
    perceiving that a validity timer associated with said continuous location service request is expired.

2. The apparatus according to claim 1, wherein
    said positioning reference signal transmission using said first positioning reference signal resource is related to a one-shot location service request of a positioning client node requesting said location determination of said location determination target, and
    in relation to said determining whether said suspension condition is fulfilled, the at least one processor, with the at least one memory and the computer program code, being configured to cause the apparatus to perform:

receiving location information for said location determination target, or receiving an indication that said location information for said location determination target were received.

3. The apparatus according to claim 2, wherein
the at least one processor, with the at least one memory and the computer program code, are configured to cause the apparatus to perform:
deciding to resume said positioning reference signal transmission, and
configuring, upon a result of said deciding to resume said positioning reference signal transmission, said access node supplying said at least one location determination target with said positioning reference signal transmission, to resume said positioning reference signal transmission using said first positioning reference signal resource.

4. The apparatus according to claim 1, wherein
the at least one processor, with the at least one memory and the computer program code, are configured to cause the apparatus to perform:
deciding to resume said positioning reference signal transmission, and
configuring, upon a result of said deciding to resume said positioning reference signal transmission, said access node supplying said at least one location determination target with said positioning reference signal transmission, to resume said positioning reference signal transmission using a second positioning reference signal resource different from said first positioning reference signal resource.

5. The apparatus according to claim 4, wherein
the at least one processor, with the at least one memory and the computer program code, are configured to cause the apparatus to perform:
determining whether a resumption condition to resume said positioning reference signal transmission is fulfilled, wherein
said deciding to resume is based on whether said resumption condition is fulfilled.

6. The apparatus according to claim 5, wherein
said positioning reference signal transmission using said first positioning reference signal resource is related to a continuous location service request of a positioning client node requesting said location determination of said location determination target, and
in relation to said determining whether said resumption condition is fulfilled, the at least one processor, with the at least one memory and the computer program code, are configured to cause the apparatus to perform:
receiving, from said location determination target, an indication to resume said positioning reference signal transmission, or
receiving, from said positioning client node requesting said location determination of said location determination target, a resume message indicating to resume said positioning reference signal transmission, or
receiving, from said access node, an indication that said access node is ready to resume said positioning reference signal transmission, or
perceiving that a suspension interval associated with said suspended positioning reference signal transmission is expired.

7. An apparatus of an access node of a mobile network providing positioning reference signals for location determination, the access node supplying at least one location determination target with positioning reference signal transmission using a first positioning reference signal resource, the apparatus comprising:
at least one processor;
at least one memory including computer program code; and
at least one interface configured for communication with at least another apparatus,
the at least one processor, with the at least one memory and the computer program code, being configured to cause the apparatus to perform:
receiving information on suspension of said positioning reference signal transmission using said first position reference signal resource, and
implementing suspension of said positioning reference signal transmission,
wherein
said information on suspension is a configuration message, from a location service control entity, to suspend said positioning reference signal transmission upon expiry of a validity timer associated with a continuous location service request of a positioning client node requesting said location determination of said location determination target, and
in relation to said implementing said suspension, the at least one processor, with the at least one memory and the computer program code, being configured to cause the apparatus to perform:
suspending said positioning reference signal transmission upon expiry of said validity timer.

8. The apparatus according to claim 7, wherein
said information on suspension is a configuration message, from a location service control entity, to suspend said positioning reference signal transmission, and
in relation to said implementing said suspension, the at least one processor, with the at least one memory and the computer program code, being configured to cause the apparatus to perform:
suspending said positioning reference signal transmission.

9. The apparatus according to claim 7, wherein
said information on suspension is an indication, from said location determination target, to suspend said positioning reference signal transmission, or is an indication, from said location determination target, that said location determination target does not utilize said positioning reference signal transmission, and
in relation to said implementing said suspension, the at least one processor, with the at least one memory and the computer program code, being configured to cause the apparatus to perform:
transmitting, to a location service control entity, an indication that said access node is ready to suspend said positioning reference signal transmission,
receiving, from said location service control entity, grant of suspension of said positioning reference signal transmission, and
suspending said positioning reference signal transmission.

10. The apparatus according to claim 7, wherein the at least one processor, with the at least one memory and the computer program code, are configured to cause the apparatus to perform: receiving, from a location service control entity, a pre-configuration on suspension of said positioning reference signal transmission, wherein said information on suspension is an indication, from said location determination target, to suspend said positioning reference signal transmission, or is an indication, from said location determination target, that said location determination target does not utilize said positioning reference signal transmission, and in relation to said implementing said suspension, the at least one processor, with the at least one memory and the computer program code, being configured to cause the apparatus to perform: suspending said positioning reference signal transmission based on said pre-configuration and said indication from said location determination target.

11. The apparatus according to claim 7, wherein the at least one processor, with the at least one memory and the computer program code, are configured to cause the apparatus to perform: receiving information on resumption of said positioning reference signal transmission and implementing resumption of said positioning reference signal transmission.

12. The apparatus according to claim 11, wherein said information on resumption is a configuration message, from a location service control entity, to resume said positioning reference signal transmission using said first positioning reference signal resource, and in relation to said implementing said resumption, the at least one processor, with the at least one memory and the computer program code, being configured to cause the apparatus to perform: resuming said positioning reference signal transmission using said first positioning reference signal resource.

13. The apparatus according to claim 11, wherein said information on resumption is a configuration message, from a location service control entity, to resume said positioning reference signal transmission using a second positioning reference signal resource different from said first positioning reference signal resource, and in relation to said implementing said resumption, the at least one processor, with the at least one memory and the computer program code, being configured to cause the apparatus to perform: resuming said positioning reference signal transmission using said second positioning reference signal resource.

14. An apparatus of a terminal in a mobile network providing positioning reference signals for location determination, the apparatus comprising:
  at least one processor;
  at least one memory including computer program code; and
  at least one interface configured for communication with at least another apparatus,
  the at least one processor, with the at least one memory and the computer program code, being configured to cause the apparatus to perform:
  identifying a state in which said terminal does not utilize positioning reference signal transmission using a first positioning reference signal resource supplied for at least said terminal by an access node, and
  transmitting information on suspension of said positioning reference signal transmission using said first positioning reference signal resource, wherein
in relation to said identifying said state, the apparatus is further configured to detect that reception of said first positioning reference signal resource is blocked;
wherein
the apparatus is further configured to identify a state in which said terminal requires said positioning reference signal transmission and transmit information on resumption of said positioning reference signal transmission,
wherein
said information on resumption is an indication, to said access node, to resume said positioning reference signal transmission, or
said information on resumption is an indication, to a location service control entity, to resume said positioning reference signal transmission,
wherein said terminal is a target user equipment for said location determination.

15. The apparatus according to claim 14, wherein
said information on suspension is an indication, to said access node, to suspend said positioning reference signal transmission, or
said information on suspension is an indication, to a location service control entity, to suspend said positioning reference signal transmission, or
said information on suspension is an indication, to said access node, that said terminal does not utilize said positioning reference signal transmission, or
said information on suspension is an indication, to said location service control entity, that said terminal does not utilize said positioning reference signal transmission.

16. The apparatus according to claim 15, wherein any positioning reference signal resource is indicative of all positioning reference signal resources including said first positioning reference signal resource.

17. The apparatus according to claim 14, wherein said information on suspension includes periodicity information indicative of a required transmission interval of said positioning reference signal transmission.

18. The apparatus according to claim 14, wherein
said first positioning reference signal resource is identified by a positioning reference signal resource set, a set of positioning reference signal resource identifiers, a positioning reference signal beam identifier, a set of positioning reference signal beam identifiers, a transmission reception point identifier, a set of transmission reception point identifiers, a cell identifier, a set of cell identifiers, a synchronization signal block, a quasi co-location source, a synchronization signals and physical broadcast channel block, a set of synchronization signals and physical broadcast channel blocks.

* * * * *